(12) United States Patent
Kondo et al.

(10) Patent No.: US 7,369,691 B2
(45) Date of Patent: May 6, 2008

(54) PROCESSOR FOR ANALYZING TUBULAR STRUCTURE SUCH AS BLOOD VESSELS

(75) Inventors: Yasuhira Kondo, Otawara (JP); Shigeharu Ohyu, Yaita (JP); Hitoshi Yamagata, Otawara (JP); Arturo Calderon, Otawara (JP); Tomohiro Kawasaki, Otawara (JP); Atsuko Sugiyama, Kuroiso (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 626 days.

(21) Appl. No.: 10/803,930

(22) Filed: Mar. 19, 2004

(65) Prior Publication Data

US 2004/0249270 A1   Dec. 9, 2004

(30) Foreign Application Priority Data

Mar. 20, 2003   (JP)   ............................ P2003-079117

(51) Int. Cl.
*G06K 9/00*   (2006.01)
(52) U.S. Cl. ...................................... 382/128; 382/131
(58) Field of Classification Search ................ 345/419, 345/424; 382/131, 128; 600/407, 425
See application file for complete search history.

(56) References Cited

U.S. PATENT DOCUMENTS 5,734,384 A * 3/1998 Yanof et al. ................. 345/424
5,891,030 A   4/1999 Johnson et al.
6,690,816 B2 * 2/2004 Aylward et al. ............. 382/128
2004/0223636 A1 * 11/2004 Edic et al. ................... 382/131
2005/0245803 A1 * 11/2005 Glenn, Jr. et al. ........... 600/407

FOREIGN PATENT DOCUMENTS

| JP | 11-318884 | 11/1999 |
|---|---|---|
| JP | 2002-504385 | 2/2002 |
| JP | 2003-514600 | 4/2003 |
| WO | WO 99/42977 | 8/1999 |
| WO | WO 01/37219 | 5/2001 |

* cited by examiner

*Primary Examiner*—Matthew C. Bella
*Assistant Examiner*—Claire Wang
(74) *Attorney, Agent, or Firm*—Oblon, Spivak, McClelland, Maier & Neustadt, P.C.

(57) ABSTRACT

Using medical three-dimensional image data, at least one of a volume-rendering image, a flat reformatted image on an arbitrary section, a curved reformatted image, and an MIP (maximum value projection) image is prepared as a reference image. Vessel center lines are extracted from this reference image, and at least one of a vessel stretched image based on the center line and a perpendicular sectional image substantially perpendicular to the center line is prepared. The shape of vessels is analyzed on the basis of the prepared image, and the prepared stretched image and/or the perpendicular sectional image is compared with the reference image, and the result is displayed together with the images. Display of the reference image with the stretched image or the perpendicular sectional image is made conjunctive. Correction of the center line by the operator and automatic correction of the image resulting from the correction are also possible.

8 Claims, 32 Drawing Sheets

PROCESSOR FOR ANALYZING TUBULAR STRUCTURE SUCH AS BLOOD VESSELS

BACKGROUND OF THE INVENTION

1. Field of the Invention

The present invention relates to a processor for analyzing a tubular structure. More particularly, the present invention relates to a processor for analyzing a tubular structure which permits three-dimensional observation, in a diagnostically useful manner, of a tubular structure (system) such as blood vessels, the intestine, the windpipe, and the esophagus on the basis of three-dimensional imaging data of a patient captured by a diagnostic medical imaging apparatus (medical modality), and quantitative analysis of indices useful for diagnosis, including the thickness (including local changes such as stenoses and lumps) or the length of a tubular structure.

2. Description of the Related Art

It has been conventional practice in the diagnosis of blood vessels, to take X-ray images while administering an angiographic agent to a patient, in order to detect the presence of abnormalities on the basis of the image values.

Under such circumstances, the recent progress in imaging technology, such as X-ray CT (computer tomography) scanners and MRI (magnetic resonance imaging), has made it possible to easily obtain three-dimensional images of areas of blood vessels to be diagnosed in a patient. As a result, it has become possible to perform tomographic diagnosis of blood vessels using such three-dimensional images.

While X-ray angiographic tests require arterial injection of an angiographic agent, three-dimensional imaging of blood vessels using X-ray CT or MRI permits angiography of blood vessels by venous injection. Venous injection is less invasive and can alleviate the burden on patients.

Blood vessel imaging methods that do not substantially require angiographic agents have been studied. In particular, tests that do not require angiographic agents based on MRI, which is a non-invasive procedure permit minimization of the burden imposed on the patient even when the test is repeated over a short period of time.

There are merits and demerits depending on the dimension of the imaging used for diagnosis. Since X-ray imaging is two-dimensional, assessment of a topological abnormality based on this imaging is limited. For example, when using X-ray images taken in one direction, the diagnosis tends to underestimate the degree of blood vessel stenosis. Use of three-dimensional imaging permits observation of a three-dimensional form, thus improving the accuracy of diagnosis of the stenosis. Three-dimensional imaging is also effective for identifying the three-dimensional structure of the blood vessel or an aneurysm. X-ray angiographic imaging at present is inadequate at rendering capillaries. However, as the image quality of three-dimensional imaging improves in future, the scope of application of diagnosis using three-dimensional images will be expanded.

Under such circumstances, the following methods have been proposed for three-dimensional topography of blood vessels.

For example, Japanese Examined Patent Application Publication No. 3-10985 discloses a method for calculating the longitudinal vector of a tubular structure taken from three-dimensional imaging data derived from X-ray CT, MRI, and ultrasonic diagnostic apparatuses by means of a "vector detector", calculating sections perpendicular to the tubular structure from the resultant longitudinal vector, and preparing and displaying images cut along these sections.

U.S. Pat. No. 5,891,030 discloses a method comprising the steps of extracting a center line of a tubular structure from an image of the tubular structure in a captured three-dimensional image; unbending the tubular structure along this center line in the longitudinal direction thereof into a stretched shape; displaying the stretched image; and displaying a volume-rendering image and a planar reformatted image corresponding to the former image.

Japanese Unexamined Patent Application Publication No. 2001-175847 discloses a method of producing MPR (Multiplanar Reconstruction) image data of a sectional surface perpendicular to the center line (center line, for example) of an extracted blood vessel, in sequence at positions along the center line of the blood vessel, and displaying the sequential images as an animation. This display method is intended to facilitate observation of the complex three-dimensional structure of blood vessels.

On the other hand, various techniques for extracting the center line of a blood vessel have already been proposed. For example, reference Onno Wink et al., "Fast delineation and visualization of vessels in 3-D angiographic images," IEEE Trans. Med. Imag., vol. 19, no. 4, 337-346, 2000 presents a method comprising the steps of determining the center line of a blood vessel as a sequence of points represented by three-dimensional coordinates, and extracting contours of a blood vessel on sectional surfaces perpendicular to the center line at the individual points on this center line. This makes it possible to achieve three-dimensional extraction of the blood vessel center line and the contours of the blood vessel (blood vessel surface). The area or diameter of the blood vessel can be determined for the individual positions along the blood vessel center line by extracting the center line and the contours of the blood vessel. This paper also presents a graph with the blood vessel diameter as the ordinate and the distance along the blood vessel center line as the abscissa.

The stenosis ratio of a blood vessel is calculated using a reference blood vessel diameter A on the assumption of the absence of stenosis, and the actual diameter B of the stenosis site in accordance with the formula: $[100 \times (1-(B/A))]$ (%). In this calculation, a method of determining the reference diameter should be needed. An example of this calculation method is disclosed in Japanese Unexamined Patent Application Publication No. 5-264232, which comprises the steps of estimating the reference diameter of a blood vessel from an angiographic image taken by a conventional two-dimensional X-ray imaging system, and calculating the stenosis ratio therefrom.

However, since a tubular structure such as a blood vessel has a complex shape because of the generally complex three-dimensional complex path, it is difficult to identify the position or the state of a disease such as stenoses and lumps even when observing a pseudo-three-dimensional displayed image (such as a volume-rendering image). When observing a two-dimensional image on an arbitrary sectional surface, on the other hand, it is very difficult to accurately set a sectional position, and this has imposed a burden on the operator, such as a physician.

These circumstances will be described in detail. The conventional three-dimensional observation method of a tubular structure such as a blood vessel or the large intestine involved various unsolved problems, as described below.

Firstly, when using a curved surface reformatted image, there is a problem in that it is difficult to readily grasp the position of a point in the curved surface reformatted image three-dimensionally and toward what direction it is directed.

Secondly, in the case of the method of displaying a sectional plane passing through the viewpoint position in a so-called "flythrough" display, information about the position in the blood vessel of a sectional plane at a position capable of being observed on the flythrough screen is unavailable.

Since the center line and the contour of the blood vessel are represented by many control points, manual editing takes additional time and labor.

Vascular diseases include aneurysm in which the blood vessel suffers from lumps. When the maximum diameter exceeds, for example, 5 mm, or the secular change in the maximum diameter exceeds, for example, 3 mm/year, the aneurysm may burst. It is generally believed that the patient should receive surgery. In the present circumstances, however, the maximum diameter of the aneurysm is observed and measured by use of an axial image. It is therefore difficult to grasp the three-dimensional shape or the secular change in diameter of the aneurysm, and the results are thus largely dependent upon the diagnostic ability and experience of the physician.

SUMMARY OF THE INVENTION

The present invention was developed in view of the various problems in the conventional observing and analyzing methods of a tubular structure (tubular system) as described above, and has a main object to provide a processor for analyzing a tubular structure that permits easy grasping of the entire and partial three-dimensional shape of a tubular structure such as blood vessel in a patient, that makes it possible to easily find and observe the position or the state of a site to be observed such as a diseased site of stenoses or lumps, and that substantially alleviates the operational burden imposed on the operator who conducts diagnosis and observation, thereby enabling the operating efficiency to be improved.

In addition to the above-mentioned main object, it is another object of the present invention to permit easier grasping of the positional relationship between a tubular structure and other structures.

In addition to the above-mentioned main object, it is still another object of the present invention to permit depiction of a tubular structure with natural contours, and more stable and highly accurate analysis of the form of the tubular structure.

In addition to the above-mentioned main object, it is another object of the present invention to make it possible to largely alleviate the effort required for manual editing of control points when setting a center line or contours of the tubular structure.

In addition to the above-mentioned main object, it is another object of the present invention to permit accurate supply of information about the secular change in a three-dimensional structure of a local diseased site, such as a lump, of a tubular structure, thereby facilitating comparative observation with the past results of the diseased site and future prediction thereof.

To achieve these objects, the analyzer of a tubular structure of the present invention is provided, as one aspect, as an analyzer analyzing a tubular structure of an object to be examined. This analyzer comprises a preparing unit configured to prepare a plurality of sets of three-dimensional image data of the same object examined; a structure extracting unit configured to extract image data indicative of a three-dimensional tubular structure, set by set, from the plurality of sets of three-dimensional image data, thereby a plurality of sets of structure image data being produced; a reference direction specifying unit configured to specify a reference direction to the plurality of sets of three-dimensional image data; a reference point specifying unit configured to specify a reference point to each center line of the tubular structure contained in each of the plurality of sets of structure image data; a stretched image producing unit configured to produce, from each of the plurality of sets of structure image data, data of a stretched image of the tubular structure in each of plural sections which are mutually the same with regard to three-dimensional positions thereof and determined based on the reference direction, thereby a plurality of sets of data of stretched images being produced; and a stretched image displaying unit configured to display the plurality of sets of data of stretched images aligned based on the reference point.

Preferably, the stretched image producing unit comprises a contour data extracting unit configured to extract contour data of the tubular structure from each of the plurality of sets of structure image data by using the center line as a reference. In this configuration, it is preferred that the analyzer further comprises a contour displaying unit configured to display the contour data of the plurality of sets of contour data of the tubular structure; a change-information acquiring unit configured to acquire information in relation to time-lapse changes of the tubular structure on the basis of the contours of a plurality of tubular structures displayed by the contour displaying unit; and an information displaying unit configured to display the acquired information in relation to the time-lapse changes.

As another aspect of the present invention, there is provided an analyzer analyzing a tubular structure of an object to be examined. This analyzer comprise a preparing unit configured to prepare three-dimensional image data of the same object examined; an image data producing unit configured to produce, from the three-dimensional image data, data of at least one of a volume rendering image of the object, a maximum intensity projection (MIP) image of the three-dimensional image data, a flat reformatted image at an arbitrary section in the three-dimensional image data; a curved reformatted image producing unit configured to produce data of a curved reformatted image from the three-dimensional image data; a center line producing unit configured to produce three-dimensional position data of a center line of the tubular structure by using the three-dimensional image data; a reference image displaying unit configured to display the center line by overlaying the position data of the center line on data of a reference image consisting of one of the volume rendering image, the maximum intensity projection (MIP) image, the flat reformatted image, and the curved reformatted image; a curved reformatted image displaying unit configured to display the center line by overlaying the position data of the center line on the data of the curved reformatted image; a center line correcting unit configured to be used for correcting a shape of the center line overlaid on the reference image displayed by the reference image displaying unit; and a curved reformatted image updating unit configured to reproduce, from the three-dimensional image data, the data of the curved reformatted image data displayed by the curved reformatted image displaying unit, in response to a correction of the shape of the center line on the reference image through the center line correcting unit, and to update the overlaying display of the center line on the reference image, updating the curved reformatted image responding substantially in real time to correcting the shape of the center line.

In this configuration, it is preferred that the analyzer further comprises an analysis unit configured to analyze a morphological feature of the tubular structure; a reception unit configured to receive a signal indicating whether or not the position of the center line displayed on both the reference image and the curved reformatted image is acceptable; and an analysis permitting unit configured to permit the analysis unit to analyze the morphological feature of the tubular structure only when the signal received by the reception unit indicates that the position of the center line is acceptable.

Furthermore, as another aspect of the present invention, there is provided an analyzer analyzing a tubular structure of an object to be examined. This analyzer comprises a preparing unit configured to prepare three-dimensional image data of the same object examined; an image data producing unit configured to produce, from the three-dimensional image data, as data of a reference image, data of at least one of a volume rendering image of the object, a maximum intensity projection (MIP) image of the three-dimensional image data, a flat reformatted image at an arbitrary section in the three-dimensional image data; a unit configured to produce data of a center line indicating three-dimensional positional information of the tubular structure, from the three-dimensional image data; a unit configured to produce data of either a stretched image or a perpendicular sectional image of the tubular structure on the basis of the data of the center line; a unit configured to use the data of the reference image, the either stretched image or the perpendicular sectional image, and the center line so that the reverence image with the center line overlaid thereon and either the stretched image or the perpendicular sectional image with the center line overlaid thereon are displayed side by side; a unit configured used for specifying a position-changeable marker indicative of both view information and interested-point information toward the tubular structure on the center line in each of the reference image and the stretched image; and a unit configured to respond to a position change of the marker on the stretched image so that the reference image into which the position change is reflected is re-depicted.

BRIEF DESCRIPTION OF THE DRAWINGS

Other objects and aspects of the present invention will become apparent from the following description and embodiments with reference to the accompanying drawings in which.

DESCRIPTION OF THE PREFERRED EMBODIMENTS

Preferred embodiments of the image processor of a tubular structure of the present invention will now be described in detail with reference to the drawings. This image processor functions as the analyzer according to the present invention.

First Embodiment

A first embodiment will be described with reference to FIGS. 1 to 14.

Figure 1:
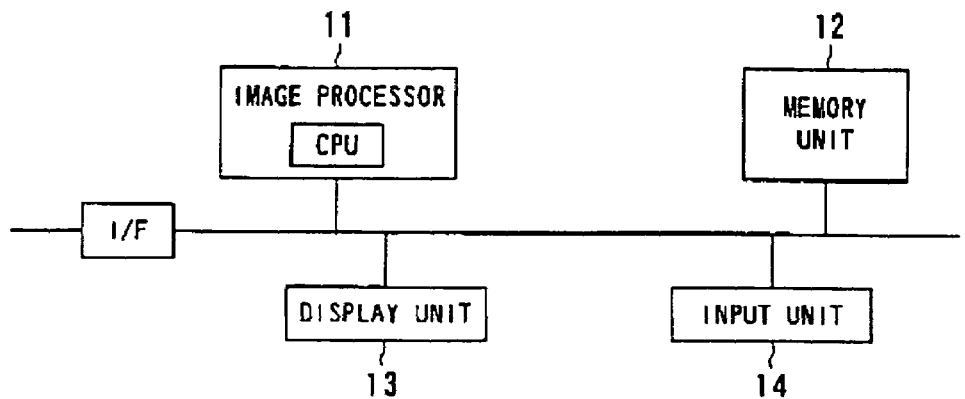
FIG. 1 is a block diagram illustrating a typical hardware configuration adopted in various embodiments of the processor for analyzing a tubular structure of the present invention.

As shown in FIG. 1, the image processor of this embodiment is provided as a computer device connected online to a medical modality via a communication line as a computer device incorporated integrally with the medical modality, or as an offline computer device separately from the medical modality.

As shown in FIG. 1, this computer device comprises an image processor 11 including a CPU and a memory, a memory unit 12 storing programs and processed data, a display unit 13, and an input unit 14. As described above, the computer device has a function of performing data communication with outside as required.

Three-dimensional (solid-body) image data of a subject collected by a diagnostic imaging apparatus (medical modality), such as an X-ray CT scanner or an MRI, are sent online or offline to the memory unit 12. These three-dimensional image data are stored in a large-capacity memory medium, such as a magneto-optical disk, provided in the memory unit.

Programs for carrying out the three-dimensional display/analysis method of this embodiment are recorded in advance in the recording medium, such as a hard disk, of the memory unit 12. The image processor 11 therefore includes a CPU 111. Upon startup thereof, the program is read out, and processing for the three-dimensional display/analysis method is sequentially executed in accordance with the procedure described in the program. During this execution, images related with the three-dimensional display/analysis method are displayed on the display unit 13, and operational information concerning the three-dimensional display/analysis method is received from the operator via the input unit 14. As a result, the image processor 11, the display unit 13, and the input unit 14 can also serve as interfaces for executing processing of automatic vessel extraction by the operator.

Figure 2:
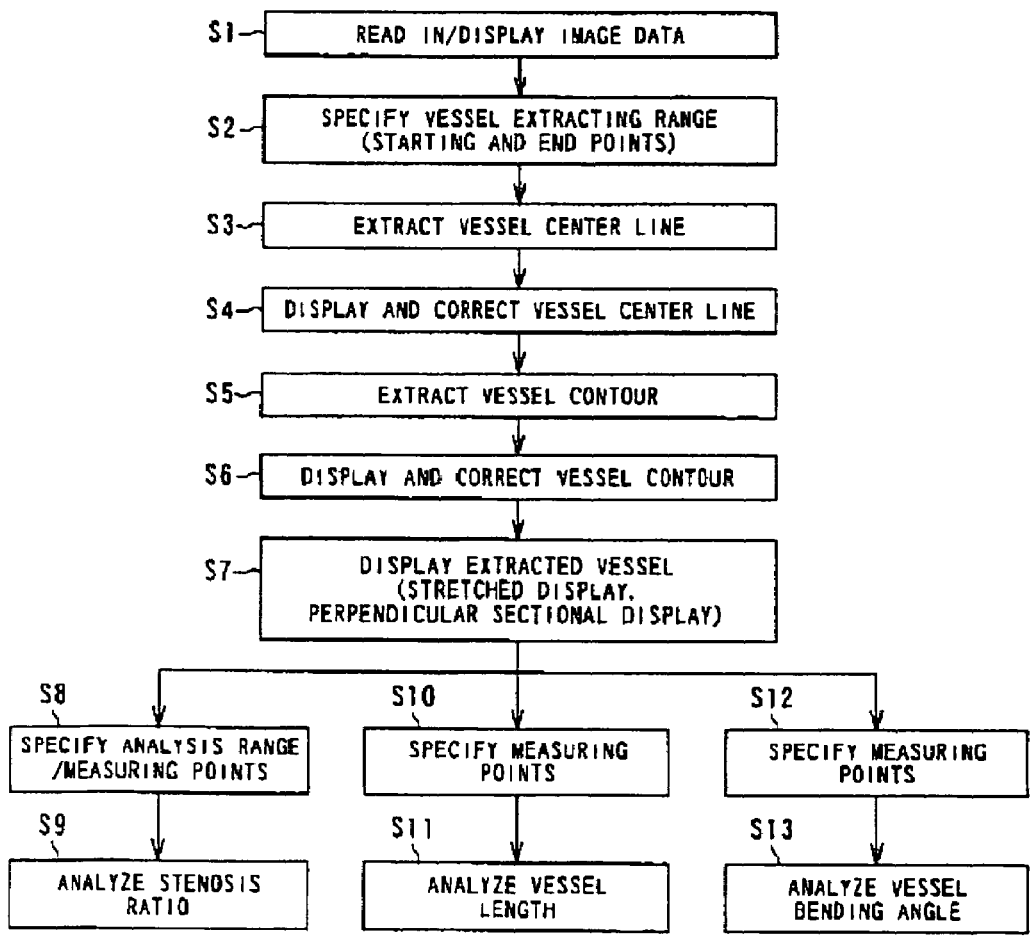
FIG. 2 is a rough flowchart illustrating an outline of the processing for display and analysis of a tubular structure, such as a blood vessel, executed in the first embodiment.

Because of such a hardware configuration, execution of programs for the above-mentioned three-dimensional display/analysis method permits obtaining the functions shown in FIG. 2 to be obtained.

In this embodiment, there are provided a processing method and a quantitative analyzing technique for effectively observing the form of a blood vessel on the basis of a three-dimensional image of the vessel photographed by using the angiographic CT/MRI.

With reference to FIG. 2, vessel analysis processing in this embodiment, which is executed by the image processor 11, will now be described. The case where the tubular structure is a blood vessel will be explained here.

<Reading in Image Data>

Image data incorporating the blood vessel to be analyzed by a diagnostic medical imaging apparatus are collected, or three-dimensional image data previously collected in this manner are read in. A three-dimensional or two-dimensional reference image is prepared from the three-dimensional image data, and this is displayed as a primary screen (primary window) (step S1). This reference image can be categorized as at least one of the following kinds of image: a volume rendering image, an MPR image (a flat reformatted image or a curved reformatted image (curved MPR image) on an arbitrary sectional surface), and an MIP (maximum value projection) image. The image data are three-dimensional image data taken over a certain distance in the body axis direction by the use of the helical CT technique. Image data of a different kind, such as image data photographed by an MRI unit or an ultrasonic diagnosing apparatus, are acceptable as long as they are three-dimensional image data containing the vessel to be analyzed. The image data are typically images (sliced images) of body-axis sections, each comprising 512×512 pixels, photographed at intervals of about 2 mm and numbering about 200 images.

<Specification of Vessel Extracting Range>

Then, a vessel extracting range is specified (step S2). In this case, the operator sets 200 sliced images to be sequentially displayed. One point in the tubular area on the displayed sliced image is specified by means of a pointing device such as a mouse, and one point on the three-dimensional space is selected from the information of the thus once specified position. This operation is carried out twice, once for the starting point S and once for the end point E, and three-dimensional coordinates ps and pe are set, respectively.

<Extension of Vessel Center Line>

Subsequently, the center line of the tubular area connecting the starting point S and the end point E of the vessel extraction range is extracted (step S3). Extraction of the center line can be accomplished by applying three-dimensional line-refining processing to the binarized data derived from extraction of the tubular area within the vessel. More specifically, a technique known as the thinning method or the skeletonization method is applicable (for example, see Ali Shahrokni et al. "Fast skeletonization algorithm for 3-D elongated objects", Proceedings of SPIE, vol., 4322, pp. 323-330, 2001). A different method for determining the center line of a tubular area is disclosed in U.S. Pat. No. 5,971,767, which is also applicable for extracting the center line in this embodiment. As a result of extraction of the center line by any of these methods, the vessel center line within the vessel range from the starting point S to the end point E can be obtained as pi (i=1 . . . N) containing N points.

The reference Onno Winkand Wiro J. Niessen, "Fast Delineation and Visualization of Vessels in 3-D Angiographic Images", IEEE Trans. Med. Imag., Vol. 19, No. 4, 2000 discloses a method of extracting the center line and the surface of a vessel by automatically tracking the interior of the blood vessel from a specified point (Vessel Tracking Method).

<Display and Correction of Vessel Center Line>

Figure 3A:
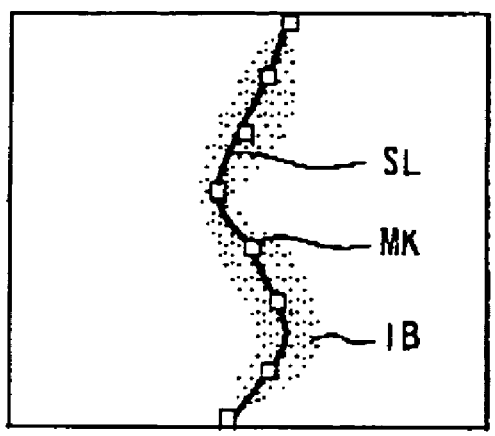
FIGS. 3A and 3B illustrate examples of display on the screen.
Figure 3B:
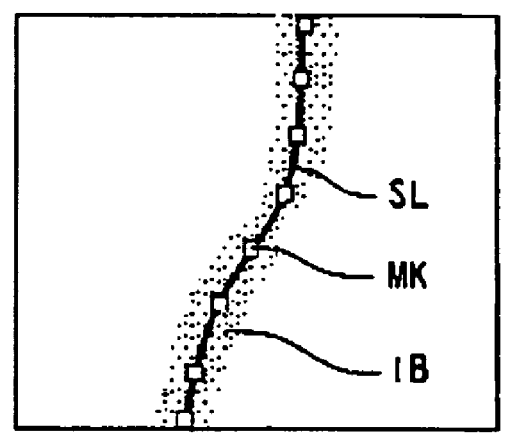

The point row of the extracted vessel center line is displayed on the screen, and at the discretion of the operator as required, this point row is corrected (step S4). FIGS. 3A and 3B illustrate an example of the screen display.

The flat reformatted image (see FIG. 3A) is a sectional view of a three-dimensional image on a plane directed toward an arbitrary direction, represented by a grey scale. In FIG. 3A, the vessel lumen is represented by a collection of dots for simplicity. While portions other than the vessel are also indicated by a grey scale, all portions are shown in white in FIG. 3A. A thick solid line SL represents the extracted vessel center line. Since the vessel center line SL is expressed as a three-dimensional curve, it is not on the same section as that of the flat reformatted image in general. It is, however, displayed in superposition as a curve projected onto this plane. The square mark MK shown on the thick solid line SL represents a control point for manually correcting the curve. The curve shape can be corrected by moving this point by operating the mouse or the like.

The curved reformatted image (see FIG. 3A) is an image obtained by enlarging, over a two-dimensional plane, a grey scale image resulting from cutting of the three-dimensional image by a curved surface expressed as a collection of straight lines perpendicular to the plane of the flat reformatted image, while passing through the points on the center line (thick solid line MK) of the flat reformatted image. As in the flat reformatted image, the vessel lumen IB is expressed by a collection of dots in FIG. 3B. In the flat reformatted image, the whole range of the blood vessel is not always displayed in the image if the vessel is three-dimensionally curved. However, since the vessel center line SL passes through the vessel interior, the whole range of the vessel for which the center line SL is defined must be depicted in the curved reformatted image if the three-dimensional position of the center line is proper. Information on the thickness or the like is therefore available throughout the whole range of the vessel by observing the curved reformatted image.

The curved reformatted image is thus effective for observing tomographic information of the blood vessel. The vessel center line (thick solid line) SL and the control point MK for manually correcting the center line SL are displayed also in the curved reformatted image. In the flat reformatted image and the curved reformatted image, the center line position can be three-dimensionally corrected by correcting the position of the control point MK.

In this embodiment, when the center line of the flat reformatted image is corrected, a curved reformatted image corresponding to the corrected new center line is remade and displayed.

The subroutine processing of correction of the vessel center line and confirmation thereof will now be described with reference to FIGS. 4 to 7.

Figure 4:
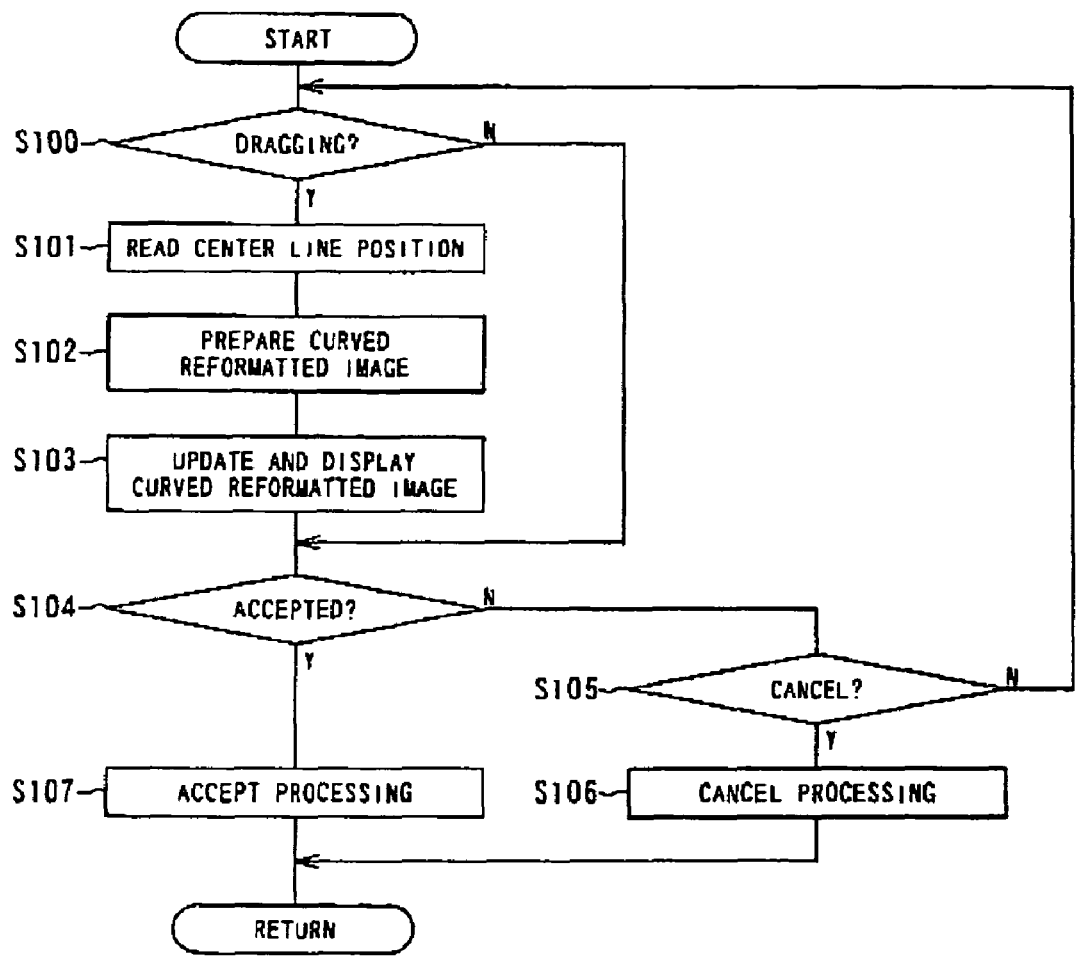
FIG. 4 is a flowchart illustrating an outline of the processing of interlocking display resulting from correction of the center line position.

An outline of the subroutine processing is illustrated in FIG. 4. When the vessel center line is extracted, for example, a reference image and a confirmation image are displayed in parallel on the screen of the display unit 13. The reference image is any of a volume rendering image, an MIP image, a flat reformatted image, and a curved reformatted image. In this example, the image is a flat reformatted image. For example, a curved reformatted image is displayed as a confirmation image. Therefore, the monitor screen shown in FIG. 5 is provided on the display unit 13.

Figure 5:
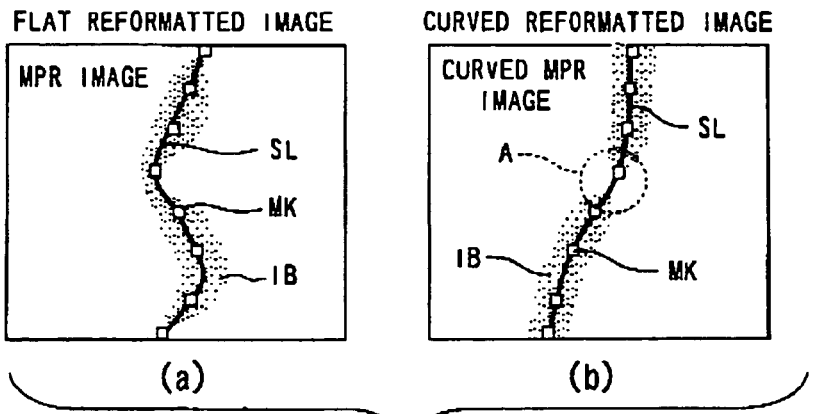
FIG. 5 illustrates a screen showing the interlocking display resulting from correction of the center line position.

As is observed in the monitor screen shown in FIG. 5, the same vessel lumen IB (i.e., the image of the blood vessel) is displayed in the flat reformatted image and the curved reformatted image, and the vessel center line SL is displayed in weight units, along the lumen thereof. Since, at the center portion in the length direction of the flat reformatted image, the position of the extracted center line SL in the lumen width direction is not satisfactory, the vessel lumen IB partially becomes scratchy and disappears at the center portion A corresponding to the length direction of the curved reformatted image. In other words, the operator who observes this image would immediately realize the necessity to correct the position of the vessel center line SL.

Figure 6:
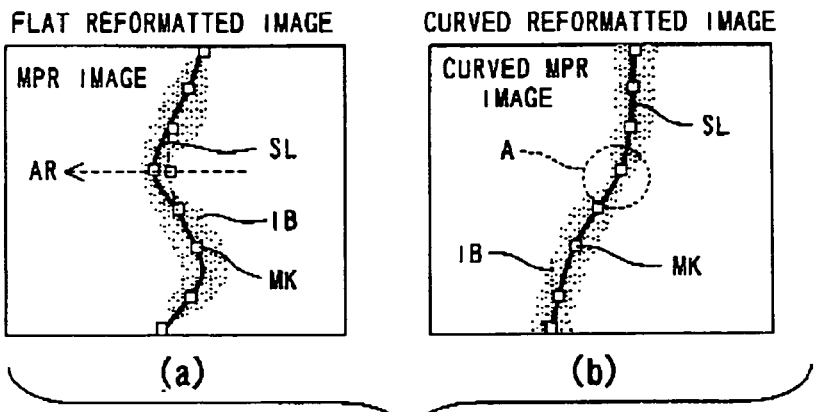
FIG. 6 illustrates a screen showing the interlocking display resulting from correction of the center line position.

Therefore, the operator corrects the position of the center line in the flat reformatted image on the monitor screen shown in FIG. 6 by "dragging the center line" by operating the input unit 14 (FIG. 4, step S100). For example, as shown by the imaginary arrow AR, the position is moved from the dotted line to the solid line. In response to this displacement, the image processor 22 reads in the positional information of the center line SL resulting from this displacement (step S101), and regenerates the data of the corrected curved reformatted image (step S102). The curved reformatted image on the monitor screen displayed currently on the display unit 13 is updated by the use of the thus regenerated data (step S103). As a result, in the monitor screen shown in FIG. 6, the vessel lumen IB properly appears on the curved reformatted image, and the center line SL is reliably positioned substantially at the center position in the width direction thereof.

Figure 7:
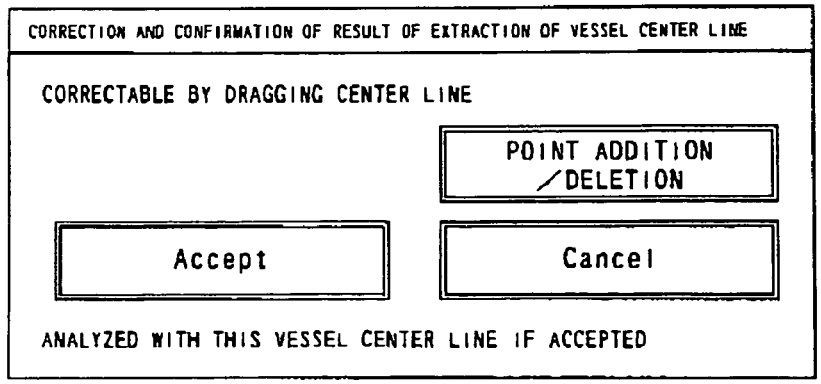
FIG. 7 is a descriptive view of a window for accepting correction of the center line position.

As shown in FIG. 7, the "correction and acknowledgement" windows of the "extraction result of the vessel center line" are simultaneously displayed on the monitor screen. The operator therefore presses an "accept" button or a "cancel" button on the "correction and acknowledgement" windows by operating the input unit 14.

In response to this, the image processor 11 reads in the signal showing "whether or not the center line position is OKed (acceptable or not)" by the operator and makes such a determination from the operating unit 13 (step S104). When the determination is NO, i.e., when the center line position is not accepted, the image processor further reads in a signal showing "whether or not the center line correction processing is to be canceled" given by the operator from the operating unit 13, and makes such a determination (step S105).

When cancellation of the center line correction processing is determined, the image processor 11 resets the monitor display to that before the series of corrections, and sets a flag representing the cancellation (step S106). On the other hand, when the determination in step S104 is YES, i.e., when the result of correction of the center line is determined to be acceptable, the image processor 11 performs a prescribed accept processing (step S107). This accept processing includes setting a flag representing acceptance of the result. The analysis processing of the vessel shape and display of its results (steps S8 to S13), which will be described later, is permitted only when this flag is set.

In this embodiment, as described above, the operator (examining physician or the like) has a chance to visually confirm whether or not the status of the center line position is proper and to correct the same as required. The center line position can be manually corrected. Along with this correction, the curved reformatted image is also automatically corrected substantially in a real-time manner. This ensures proper drawing of the blood vessel (lumen) throughout the entire range of the center line definition in the curved reformatted image, thus making it possible to correct the center line while properly grasping the vessel form. It is therefore possible to more rapidly carry out the correcting operation. In the adopted system, analysis of the vessel form described later is permitted only when the result of correction of the center line is reasonable. It is therefore possible to further increase the reliability of the result of analysis.

<Extraction of Vessel Contour>

When the final vessel center line is thus established, three-dimensional data of the vessel contour, i.e., of the vessel surface shape are extracted (step S5). This extraction is executed by using, for example, the technique disclosed in the reference mentioned in the section of the prior art "Onno Wink et al., "Fast delineation and visualization of vessels in 3-D angiographic images", IEEE Trans. Med. Imag., vol. 19, no. 4, 337-346, 2000". As a result, the shape of the vessel contours at the vessel sections (sections substantially perpendicular to the vessel center line) corresponding to points in a finite number on the vessel core is available as positional information of points in the finite number on the contour. By using this information, a three-dimensional curved surface can be defined. The thus defined curved surface represents a three-dimensional shape of the blood vessel surface.

<Display and Correction of Extraction of Vessel Contour>

Then, the shape of the vessel contour made available as above is displaced on the monitor, and pieces of positional information in a finite number on the contour thereof can be corrected in response to operator's operation, as in the case of correction of the center line position as required (step S6).

<Display of Extracted Vessel Wall>

Figures 8A, 8B, 8C:
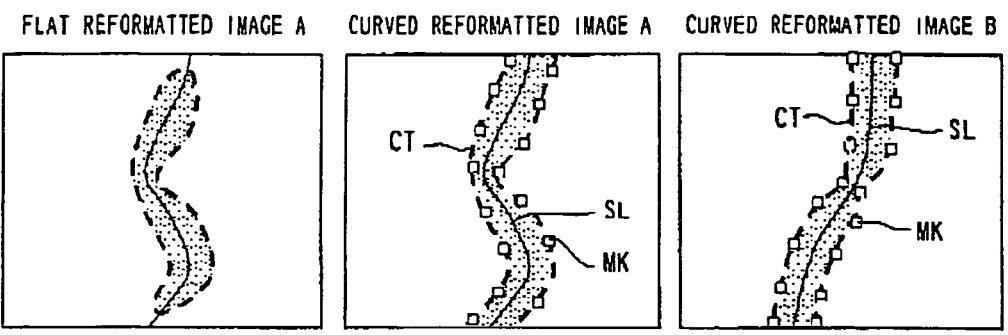
FIGS. 8A to 8C illustrate screens showing examples of the display of extracted blood vessel walls.

The shape of the vessel surface determined through the above-mentioned extraction of the vessel contour is displayed in superposition as a contour line over the above-mentioned flat reformatted image and curved reformatted image as shown in FIGS. 8A to 8C (step S7).

In order to execute this processing, means for determining the contour line is necessary. The contour line is a line representing crossing of a three-dimensional vessel surface with a flat plane of a flat reformatted image and a curved surface of a curved reformatted image. Calculation and display thereof are accomplished by repeating, throughout the entire curved surface, a processing of determining and displaying local lines of intersection of local curved surfaces of the vessel surface represented by control points and the surface of the reformatted image. Examples in which the vessel wall is displayed on the flat reformatted image and a curved reformatted image are illustrated in FIGS. 8A to 8C.

Figures 9A, 9B:
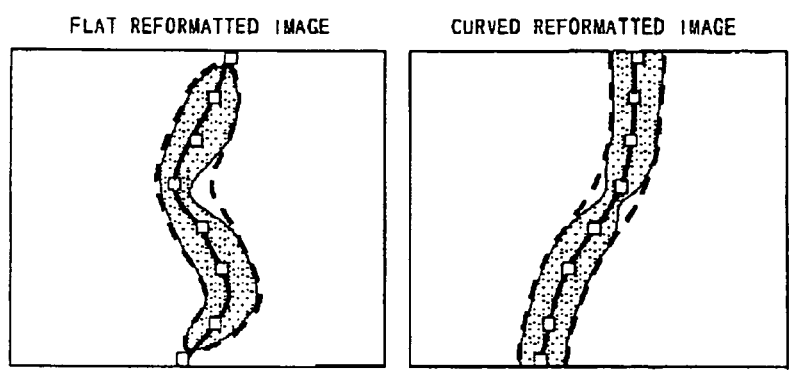
FIGS. 9A and 9B illustrate screens for explaining correction of the contour of the vessel.

The method for preparing a flat reformatted image and a curved reformatted image is the same as in the case of displaying the center line. On the other hand, the curved reformatted image A is a result of spreading along a flat plane and display of a curved surface expressed as a collection of straight lines passing through points on the center line in parallel with the flat plane of a flat reformatted image and a grey scale image of a three-dimensional image cross-section. The vessel center line (thin solid line) SL and the contour line (line of intersection of the vessel wall and a curved surface) CT are displayed in superposition thereover. Control points (squares) MK for curved surface shape correction are displayed on the contour lines of the curved reformatted images A and B. The curved surface shape (vessel surface shape) can be corrected by moving the position of the control point MK by means of a pointing device such as a mouse. Examples of this correction are illustrated in FIGS. 9A and 9B, respectively.

As in the correction of the center line position, the displayed curved surface shape is confirmation by the operator, and if it is determined to be proper, the operator clicks the "confirmation" button. When the "confirmation" button is pressed, the displayed contour shape is established and used for the subsequent analyzing processing. When the "confirmation" button is not clicked, the contour shape is never used for the subsequent processing. This ensures output of the highly accurate result of analysis.

<Display of Extracted Vessel>

Then, the extracted blood vessel is displayed (step S7). This display of the vessel is carried out by displaying a perpendicular sectional image on the perpendicular view (screen), and displaying an extracted image of the vessel on the straight view (screen).

[Display of perpendicular sectional image]

When the vessel center line is extracted, it becomes possible to define a section perpendicular to the center line at each point on the center line. This permits display of a flat reformatted image on this surface as a perpendicular sectional image (see FIG. 10B). Particularly, the image processor 11 prepares, in a real-time manner, and displays, upon each change in section to be displayed along the center line, a corresponding perpendicular sectional image. This is useful for determining the three-dimensional structure of blood vessel such as stenosis.

[Display of vessel stretched image]

The image processor 11 prepares the above-mentioned perpendicular sectional images at slight intervals on the center line, and a three-dimensional volume image is prepared by piling up these images. A volume image (extended volume image) is prepared so that the vessel center line corresponds to a particular position (at the center, for example) of the thus prepared perpendicular sectional image. Within this volume image, the vessel center line forms a straight line. Planes within the extended volume image substantially in parallel with this straight line are set, and a flat reformatted image is prepared from these planes. This leads to preparation and display of a vessel stretched image having a center line of vessel extending straight (see FIG. 10A).

The vessel stretched image, clearly showing changes in shape such as thickness in the axial direction of the vessel, is useful for observing the three-dimensional shape of the blood vessel from a point of view different from the perpendicular sectional image. Therefore, display of combinations of the perpendicular image and the vessel stretched image as shown in FIGS. 10A and 10B is particularly useful.

Figure 10:
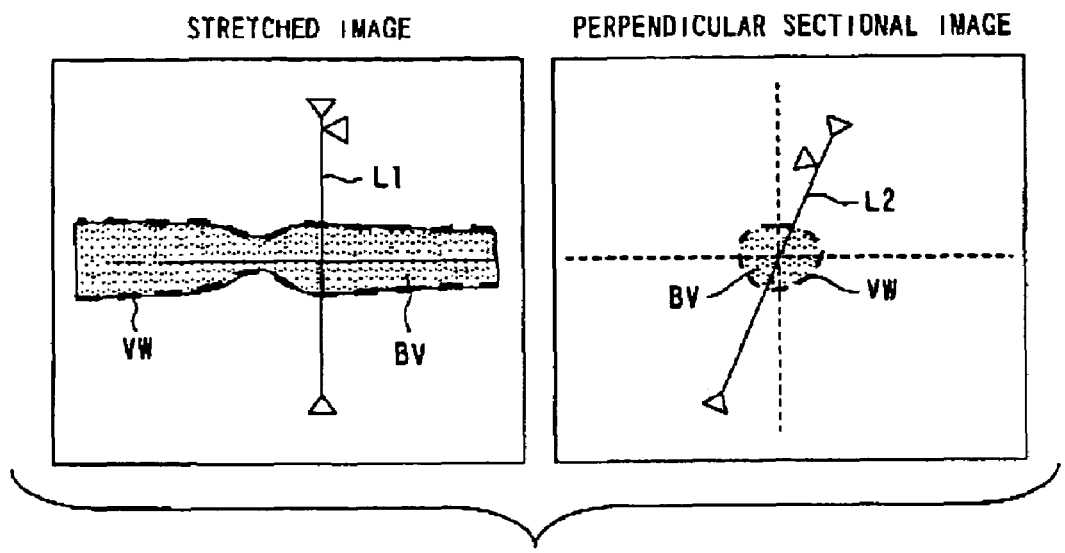
FIG. 10 illustrates an example of the display of a blood vessel image.

The area BV in FIG. 10 represents an area of blood vessel in the prepared reformatted image. The thick broken line VW represents the shape of the extracted vessel wall by means of curves of intersection of the planes having prepared the reformatted images and the vessel wall. The longitudinal line L1 on the vessel stretched image is a cursor indicating the position of the section displayed on the perpendicular sectional image, which can be moved to the right or left on the screen in response to the operators operation. Upon receipt of this displacement instruction, the image processor 11 draws again the corresponding perpendicular sectional image in a real-time manner on the perpendicular view.

The diagonal line L2 on the perpendicular sectional image is a cursor indicating a section of the vessel stretched image which is similarly rotatable by user's operation. Along with this rotating operation, the image processor 11 draws again the corresponding section in a real-time manner on the straight view. Both ends of the cursors L1 and L2 serve as click points, and dragging these points with a mouse permits displacement of the cursor. The triangles provided near the cursors L1 and L2 are symbols showing in what direction relative to the image the section is viewed.

When actually preparing a vessel stretched image and a perpendicular sectional image in the image processor 11, the applicable method is not limited to the above-mentioned one which comprises the steps of intermediately preparing an extended volume as described above, and preparing a vessel stretched image by the use of the flat reformatting technique. The vessel stretched image can be prepared directly from an extracted vessel center line. The details of this vessel stretched image preparing method will be described later.

On the other hand, the image processor 11 can switch over the operation, as required, from the display state of vessel extension to an MIP (maximum value projection) image based on the flat reformatted image. As a result, in the case of a vessel stretched image based on the MPR method, in which the vessel center line coming off the extracted vessel wall may cause breakage of the extracted vessel, switching to an MIP image makes it possible to provide an image free from an interruption.

<Specification of Analyzing Range, Specification of Measuring Points/Analysis of Stenosis Ratio>

Subsequently, the analyzing processing of the vessel shape is carried out. This analyzing processing is allowed only when operator's confirmation is obtained (accepted) on the screen as to the center line position and the vessel surface shape.

Upon the completion of the above-mentioned display of the extended vessel, it becomes possible, in the image processor 11, to specify the range of analysis of stenosis ratio and measuring points, thus permitting analysis of the stenosis ratio in response to this specification (steps S8 and S9).

In order to conduct stenosis ratio analysis, it is first necessary to specify measuring points. Measuring points are specified by the image processor 11 as follows.

Figure 11:
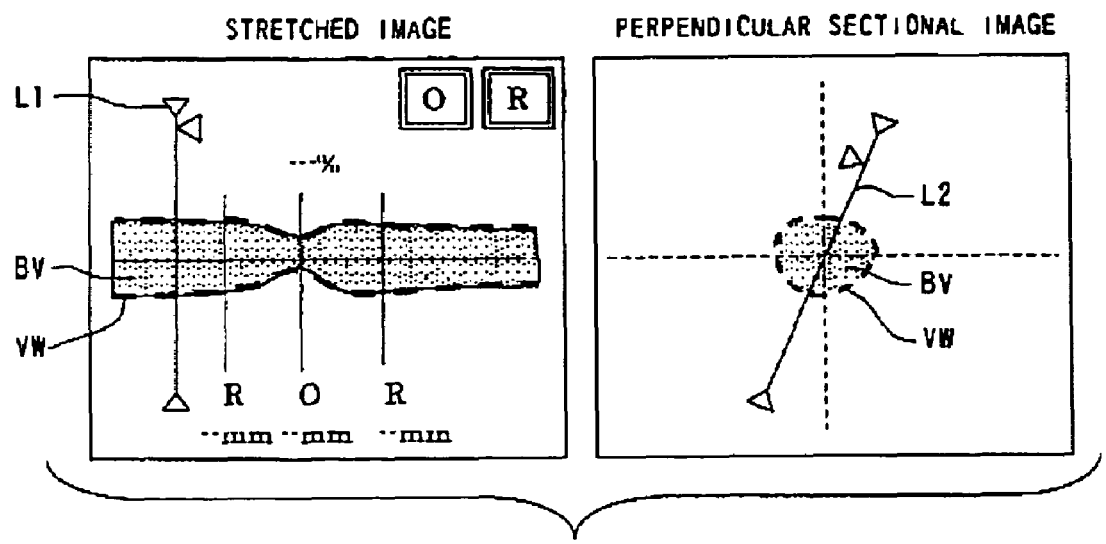
FIG. 11 illustrates an example of the display of the result of analysis of a vessel.

FIG. 11 illustrates a typical screen for the specification of measuring points. This screen displays a vessel stretched image and a perpendicular sectional image, as well as buttons labelled "O" and "R". When the cursor L1 is aligned with a position where the vessel is observed to be the thinnest on the perpendicular sectional image by moving the cursor L1 in a straight view (see FIG. 11A), and the "O" button is selected here, a longitudinal line is displayed at the position at the point in time of the cursor L1, and a label "O" is affixed to this longitudinal line. When the cursor L1 is set at a position where the vessel is observed to have a normal thickness, and the button "R" is pressed, a longitudinal line is similarly displayed, and a label "R" is attached thereto. The vessel thickness at that sectional level is displayed near the displayed label "O" and "R".

Even after the measuring points labelled "O" or "R" as described above are specified, re-specification is possible by pressing again the button "R" or the like after displacement of the cursor. The configuration may be such that the positions of the measuring points can be corrected by dragging the line representing a specified point.

The information about the extracted vessel wall is used for measuring the vessel thickness. For a blood vessel photographed three-dimensionally, an average diameter or a minimum diameter may be used, apart from a sectional area, to express the vessel thickness. For example, the configuration may be such that an average diameter is displayed for a measuring point in a portion R (normal portion), and a minimum diameter is displayed for a measuring point in a portion "O" (portion of the most serious stenosis).

The image processor 11 calculates a stenosis ratio by a calculation formula "((normal portion diameter−stenosis site diameter)/normal portion diameter)×100(%)", and the result value of this calculation is displayed near the longitudinal line displayed at the position of the measuring point of the portion O (portion of the most serious stenosis). The number of measuring points for the portion R (normal portion) is not limited to one, but two or more may be specified. When the portion R (normal portion) has only one measuring point, the diameter of the portion R is used as the normal portion diameter. On the other hand, when a plurality of measuring points are specified, the average value of diameters for the plurality of portions R may be adopted as the normal portion diameter.

Figure 12:
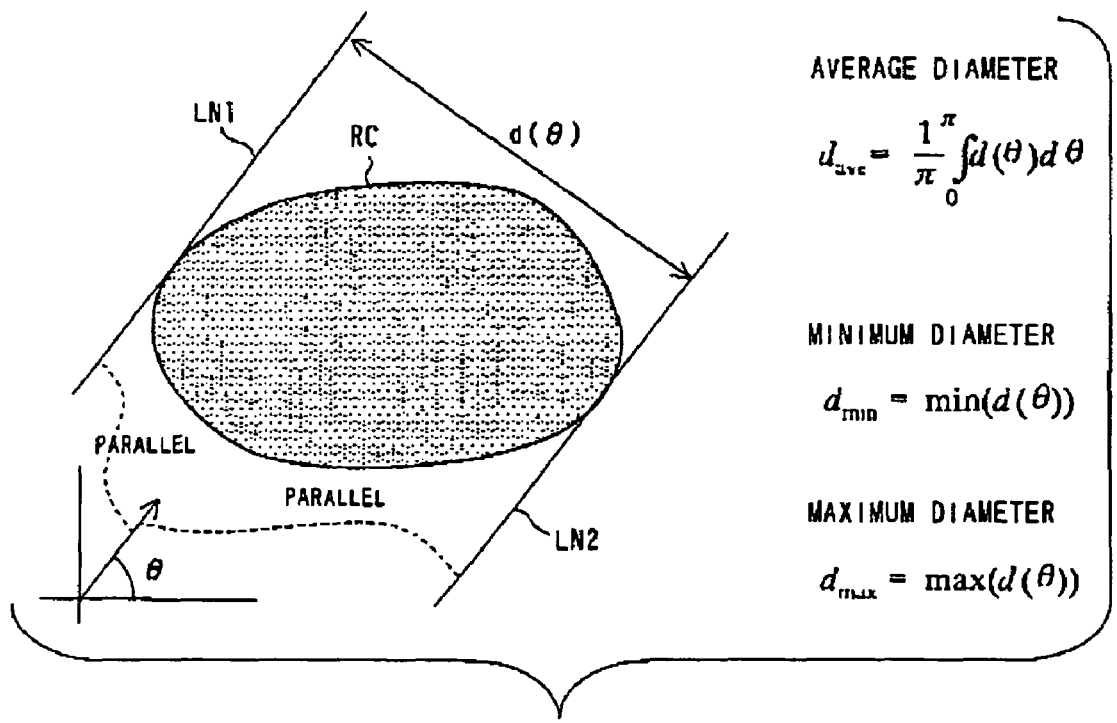
FIG. 12 illustrates another example of the display of the result of analysis of a vessel.

The average diameter or the minimum diameter is determined as follows. As a result of blood vessel wall extraction, the vessel contour shape of a sectional image of vessel has been obtained. This contour is expressed by lines around an area RC as shown in FIG. 12. When considering a straight line directed toward a direction at an angle θ in a plane including this area RC, there exist two straight lines LN1 and LN2 in which all the vessel areas are contained only on one side of this former straight lines. The two straight lines LN1 and LN2 are in parallel with each other, and the distance d(θ) between them represents the vessel thickness as projected in the direction of the angle θ. The average diameter is an average value over values d(θ), and the minimum diameter is the minimum value of d(θ). Since the average diameter and the minimum diameter do not depend upon the reference direction of the angle θ (what direction is to be θ=0), the operator may arbitrarily select a reference direction for each section. Apart from the above, the effective diameter (=square root of area) may be used.

<Sectional Area Curve/Diameter Curve>

The image processor 11 may have a configuration in which, as part of the processing of analysis of stenosis described above (step S9), a various factors relating to blood vessel is calculated, and displayed in the form of a graph.

It is possible to draw a curve showing information about how the vessel thickness changes along with running of the blood vessel by calculating the vessel lumen area, the average diameter, the implemented diameter, the minimum diameter and the maximum diameter while moving the points on the vessel center line along the vessel center line. It is similarly possible to draw a curve showing how the stenosis ratio changes along the vessel, by calculating the stenosis ratio while changing the 0-point.

Figure 13:
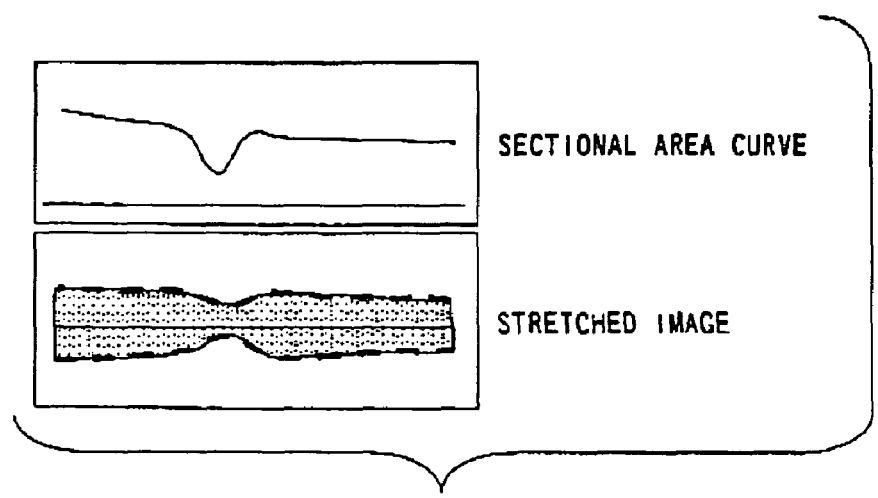
FIG. 13 illustrates still another example of the display of the result of analysis of a vessel.

FIG. 13 illustrates a typical sectional area curve displayed together with the vessel stretched image. Apart from this, graphs regarding the vessel lumen area, the average diameter, the implemented diameter, the minimum diameter, the maximum diameter and/or the stenosis ratio can be appropriately prepared and displayed in a similar manner. The operator can intuitively understand what site of the vessel suffers from stenosis to what extent by observing these graphs. As a result, the operator can not only early discover an abnormal site of vessel, but also easily understand how the vessel thickness varies around the discovered abnormal site and over what length the abnormality is becoming more serious.

<Specification of Measuring Points/Analysis of Vessel Lengths>

Upon the completion of display of the above-mentioned extracted vessel (step S7), the image processor 11 specifies measuring points, thus permitting analysis of the vessel length corresponding to these measuring points (steps S10 and S11).

Figure 14:
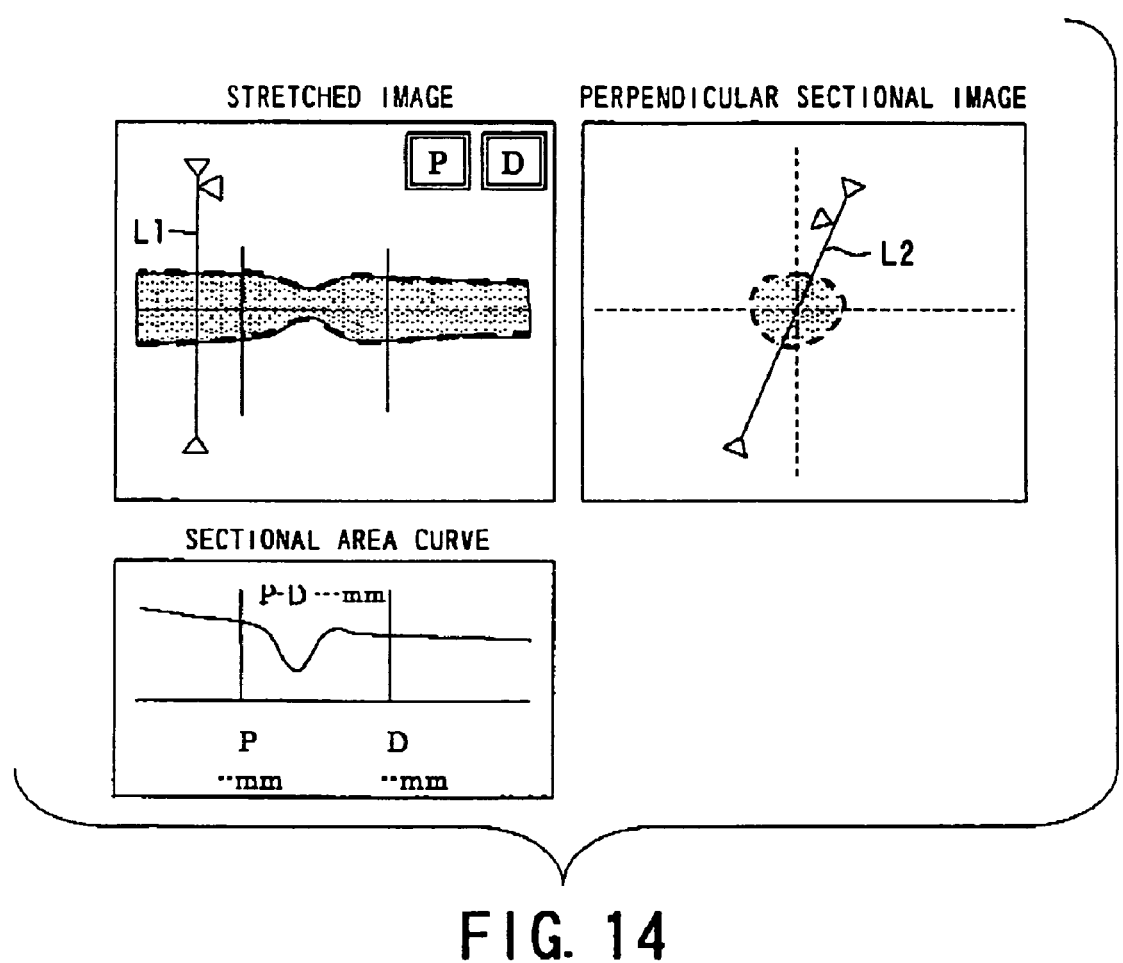
FIG. 14 illustrates yet another example of display of the result of analysis of a vessel.

Another favorable permit of extracting the vessel center line is the possibility to easily carry out analysis of the vessel length along the vessel center line. FIG. 14 illustrates a typical analysis screen of the vessel length.

When the button "P" is pressed in the vessel stretched image by transversely moving the cursor L1, a point P, a measuring point, is set. A symbol "P" is provided on a curve (for example, the sectional area curve) displayed simultaneously, and the distance from the leading end of vessel range extracted at point P is displayed in mm. When the cursor L1 is further moved and the button "ID" is pressed, another measuring point D is set and a symbol "D" is given on the graph. The distance from the leading end of the vessel range of point D is displayed in mm.

Even after once specifying measuring points, the specification can be modified by moving the cursor, and then pressing again the button "P" or "D". The position of the measuring points may be made correctable by dragging the line representing the specified measuring point.

The length displayed by the analysis of such a vessel length is not a three-dimensional space-like Euclidean distance, but a length along the vessel center line. The vessel center line is a curve represented by a plurality of control points (typically a cubic spline curve), and can express coordinates on the curve in the form of a parameter such as $x(t)$ by using a parameter t. On the assumption that the differential of $x(t)$ as to t is $x'(t)$, the distance from the parameter $t_1$ to $t_2$ is calculable by a formula:

$$d = \int_{t_1}^{t_2} |x'(t)| dt$$

When measuring points for both points P and D are set, the distance from point P to point D along the vessel center line is calculable by the same method as above. The resultant value is displayed, for example, on a sectional curve.

According to such an analysis of the vessel length and the method for displaying the same, the operator can specify two points on the vessel center line only by moving the cursor L1 on the vessel stretched image to the right or to the left. In this case, the operator can determine these measuring points while observing a change in the vessel thickness by means of the vessel stretched image and the sectional area curve. When specifying a measuring point on a three-dimensional space in a volume rendering screen as in the conventional art, it is difficult to determine a measuring point while making such a comparison, and it is also difficult, on the screen, to determine whether or not the specified measuring point is the point intended by the operator. As compared with this, in contrast, the method for specifying measuring points on the vessel stretched image in this embodiment permits easy determination of what portion of the vessel the specified measuring point corresponds to, and as required, makes it possible to easily correct a once specified position of the measuring point, leading to a higher reliability of the result of length analysis.

<Specification of Measuring Point/Analysis of Vessel Bending Angle>

Upon the completion of display of the above-mentioned extracted vessel (step S7), the image processor 11 specifies measuring points, thus permitting analysis of the vessel bending angle in response to the specified points (steps S12 and S13).

More specifically, as in the analysis of the vessel length, specification of three points on the vessel center line makes it possible to calculate the angles between them. When the three points have a three-dimensional coordinates $x_1$, $x_2$, $x_3$, the vessel bending angle is calculable by:

$$\alpha = \frac{180}{\pi} \cos^{-1}\left(-\frac{x_1 - x_2}{|x_1 - x_2|} \cdot \frac{x_3 - x_2}{|x_3 - x_2|}\right) [deg]$$

and the result of calculation is displayed in an appropriate manner (Variations Applicable to First Embodiment)

Various variations additionally applicable to the basic configuration of the image processor of a tubular structure of the above-mentioned first embodiment will now be described with reference to the drawings.

(First Variation)

The first variation relates to a processing for facilitating grasping of the orientation (spatial positional relationship) executed by the image processor 11

<(1.1) Orientation in Straight View (Marker Display)>

A measure for facilitating grasping of orientation is an orientation instructing function in the straight view (vessel stretched image). More specifically, it is the marker display.

Figures 15A, 15B, 15C:
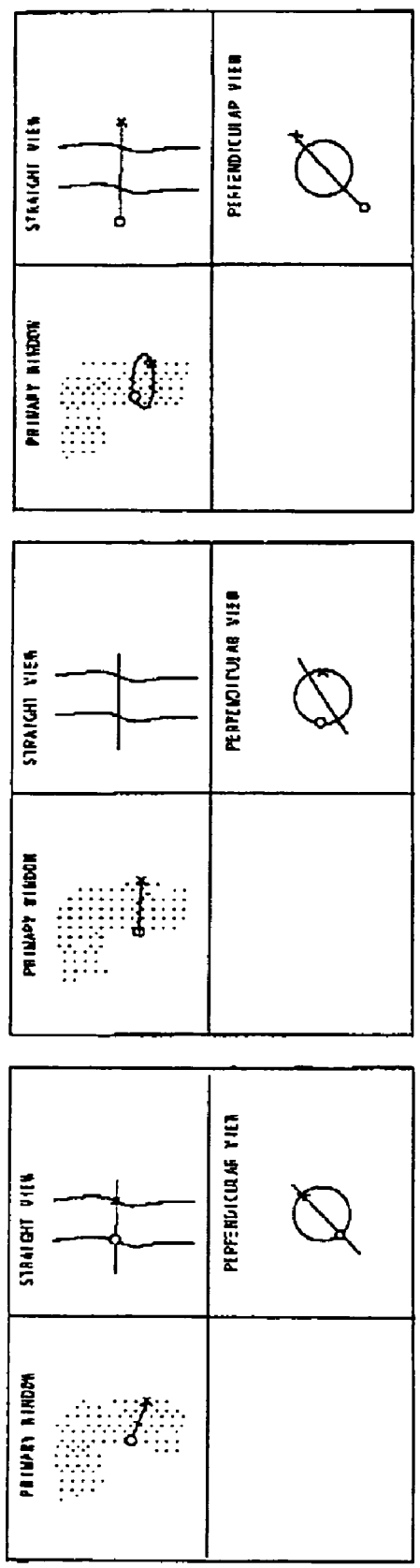
FIGS. 15A to 15C illustrate screens for explaining an example of facilitation of orientation in a first variation of the first embodiment.

As shown in FIGS. 15A to 15C, markers o and x are displayed on the vessel wall corresponding to the primary screen in correspondence to the vessel wall A (left) and the vessel wall B (right) on the vessel stretched image. This indicates the relationship between the right and left directions of the blood vessel.

This display is applicable to both a case where the amount of twist is corrected and a case where the amount of twist is not corrected. If the vessel stretched image contains vessel's apparent twist, it becomes difficult to grasp the positional relationship. To solve this problem, a marker o or x is displayed on the vessel wall on the vessel stretched image. Then, a marker of the same kind is displayed at the corresponding position of the vessel wall on the primary screen. A similar marker display is made also on a perpendicular sectional image (see FIG. 15A).

FIG. 15B illustrates a case where markers are displayed on both sides of the vessel of a reference image on the primary screen at a position of the vessel corresponding to the cursor bar of the vessel stretched image. The perpendicular sectional image has two corresponding marker positions to the right and to the left of the vessel. The marker is displayed at these two points.

FIG. 15C illustrates a case where a marker is displayed at the same position as in FIG. 15A on the perpendicular sectional image; a marker is displayed at the same position as in FIG. 15A also in the reference image on the primary screen; and furthermore, the shape of the vessel contour of the reference image of the primary screen is displayed in weight. In the vessel stretched image, in correspondence to the right-left positional relationship of two markers (o and x) on the reference image, corresponding markers are displayed to the right and to the left of the cursor bar.

<(1.2) Orientation in Straight View (Bent Clip Face)>

As another measure for facilitating grasping of the orientation, there is provided an orientation instructing function using a bent clip face in the straight-view vessel stretched image.

Figure 16A:
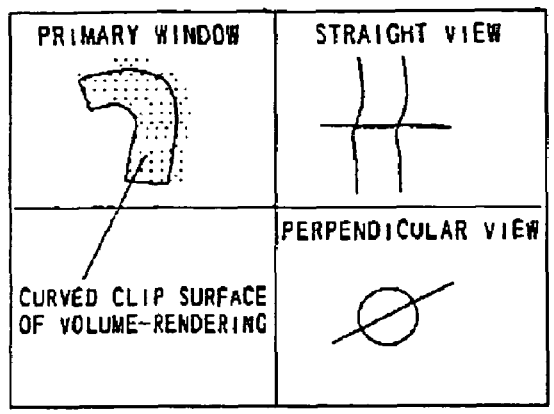
FIGS. 16A and 16B illustrate screens for explaining an example of facilitation of orientation in the first variation.
Figure 16B:
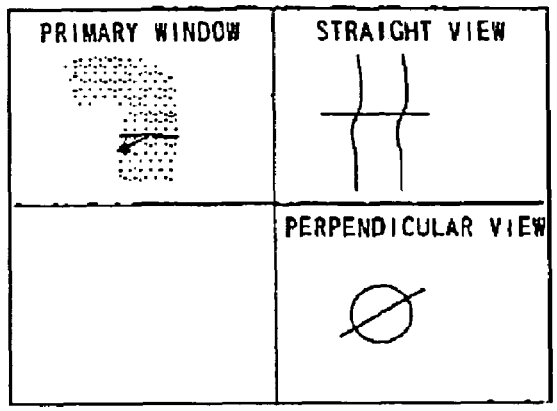

For example, as shown in FIG. 16A, a bent clip face corresponding to the section of the vessel stretched image is displayed on the primary screen to permit grasping of the orientation of the section of the vessel stretched image. As shown in FIG. 16B, the normal direction of the vessel stretched image is displayed by an arrow on the primary screen.

(a) Specifically, volume data for clipping indicating a range to be displayed of a volume rendering image are provided. It is determined whether or not the boxel position of each volume data has a distance from the vessel center line smaller than a certain value and whether or not it is within an area existing on this side of the section in the straight view vessel stretched image; and the result of determination is reflected in the clipping volume data. When displaying the volume rendering image on the primary screen, reference is made to the volume data for clipping, and only an area for which the result of determination is false is displayed. The volume data for clipping may be stored as boxel data of which the true or false result of determination is recorded in correspondence to all the boxels of the volume, or may be stored in a information-compressed form equivalent to storing all such data.

(b) A line A corresponding to the cursor bar position on the vessel stretched image of the straight view is displayed on the volume rendering image, the MIP image or the flat reformatted image on the primary screen; a vector directed toward this side of the screen, which is perpendicular to the sectional plane of the vessel stretched image is determined; and an arrow directed toward this vector is displayed at a position corresponding to the vessel center line of the line A of the primary screen.

<(1.3) Conjunctive Displacement from Primary Screen to Straight Views

As another measure to facilitate identifying the orientation, an interlocking processing from the reference image on the primary screen to the vessel stretched image on the straight view is provided.

The method using the vessel stretched image on the straight view and the perpendicular sectional image on the perpendicular view is a convenient display method for observing a change in the vessel thickness or the sectional shape. However, difficulty is pointed out in identifying the positional relationship between vessels of the patient and other tissues of the patient. This is because, from the images displayed on these sections alone, it is impossible to easily determine the positional relationship as to from what of the surrounding tissues the sections have been cut.

In this example, therefore, this problem can be solved by providing simultaneously a reference image having view directions relating to positions of the sectional images in addition to the vessel stretched image and the perpendicular sectional image.

Figure 17:
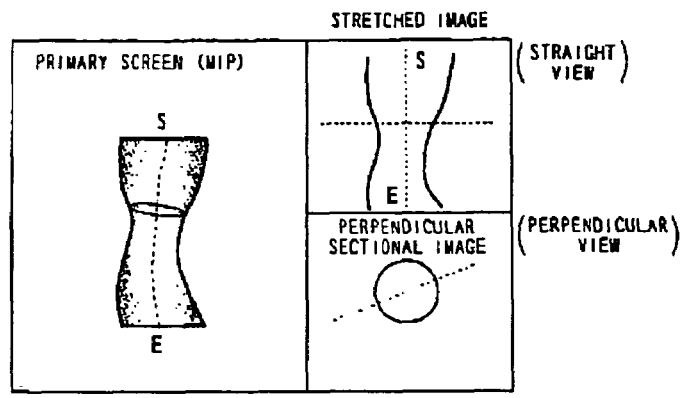
FIG. 17 illustrates a screen used for explaining an interlocking display applicable to the first variation.

FIG. 17 shows a case where three screens including a vessel stretched image, a perpendicular sectional image, and a reference image are displayed within a single monitor screen.

As a reference image on the primary screen, a partial MIP image of the patient taken in a view direction is displayed. An MIP image is displayed in this case as an example. A volume-rendering image or a flat reformatted image may however be displayed. In this configuration, the view direction is changeable by a mouse or keyboard operation.

Specifically, when displaying this screen for the first time, or when the view direction is changed by operator's operation, a reference image is drawn by the image processor 11 by using a coordinate conversion matrix representing an initial view direction depending upon operator's operation or a coordinate conversion matrix representing the new modified view direction.

Then, a curved reformatted image which is perpendicular to the view direction vector of the reference image and has a straight line passing through the vessel center line and perpendicular to the vessel center line as the abscissa is prepared, and this image is displayed on the straight view as a vessel stretched image.

Figure 18A:
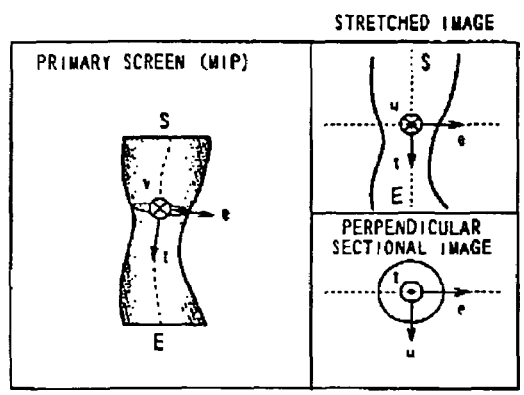
FIGS. 18A and 18B illustrate other screens used for explaining an interlocking display applicable to the first variation.

When preparing this curved reformatted image, a straight line is first determined, as shown in FIG. 18A, which is perpendicular to the vessel center line and perpendicular to the view vector for each point obtained by dividing the vessel along the vessel center line from point S (leading end point of the extracted vessel) at intervals corresponding to single pixels of the vessel stretched image, and this is used as a first axis of the vessel stretched image. If the unit tangential vector (directed toward E) of the vessel center line at a point at a distance t along the vessel center line from point S is t, and the view direction vector of a unit size directed toward the depth in the primary screen is v, the vector e directed toward the first axis of the vessel stretched image is calculable as $e = t \times v$. The vessel stretched image is prepared by sampling images at equal intervals along this vector, and this image is displayed on the straight view.

Then, a sectional image perpendicular to the section of this vessel stretched image is prepared, and displayed as a perpendicular sectional image on the perpendicular view. It is assumed that the vector expressing the first axis of this screen is e as in the vessel stretched image, and the vector representing the second axis is $u = e \times t$. A perpendicular sectional image is prepared by determining the pixel value at a point of coordinates $r(i, j) = ihe + jhu + p(t)$ through sampling by using these two vectors e and u. In this formula, h represents the length per pixel of the perpendicular sectional image, and p(t), a point on the vessel center line (at a distance t from point S).

Figure 18B:
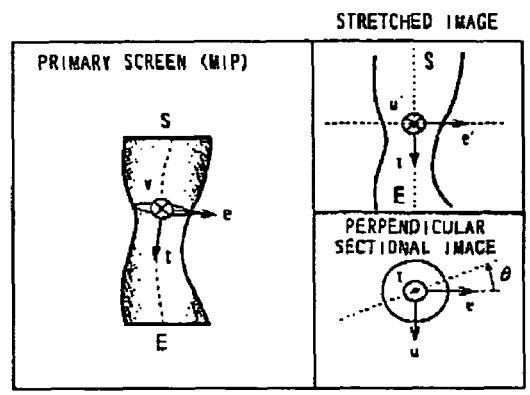

Then, the section of the vessel stretched image can be rotated by rotating a cursor bar on the perpendicular sectional image in this state. For example, as shown in FIG. 18B, when the cursor bar is rotated anticlockwise by an angle θ, the vessel stretched image is re-sampled by the use of a vector $e' = e \cos \theta - u \sin \theta$ which is dependent on t. As a result, it is possible to prepare data for the vessel stretched image on a section inclining by the angle θ depending upon the cursor bar.

The direction of the perpendicular sectional image can easily be determined since a relationship is always established so that the depth of the primary screen is directed substantially downward of the plane of the perpendicular view. Because a section substantially in parallel with the primary screen forms the vessel stretched image when a cursor bar is horizontal on the perpendicular sectional image, it is possible to obtain easily information about which of the sections corresponds to the vessel stretched image.

(Second Variation)

The second variation relates to interlocking from the vessel stretched image on the straight view to the reference image on the primary screen (tangential view mode) executed by the image processor 11.

In the above-mentioned first variation, easy identification of the sectional position is permitted by causing interlocking of the three screens so that the depth direction of the primary screen substantially agrees with the screen longitudinal direction of the perpendicular view and the section of the vessel stretched image on the straight view substantially agrees with a plane in parallel with the primary screen. This interlocking display is effective for identifying an ordinary rough positional relationship since the operator never loses sight of the relationship between the surrounding tissues and the direction of the screen for the reference image, because the direction of the plane of the primary screen is never arbitrarily changed.

However, when it is necessary to accurately determine the position, in a three-dimensional space, of the section, including a case where it is desired to confirm the positions of fine structures displayed near and around the blood vessel on the vessel stretched image, the technique used in the above-mentioned first variation is not always sufficient. In other words, only an appropriate positional relationship is identifiable, and this may require much time and trouble. In this variation, a screen moving method (tangential view mode) useful in such cases is provided. Specifically, the method is executed by the image processor 11 in the following procedure.

Figure 19:
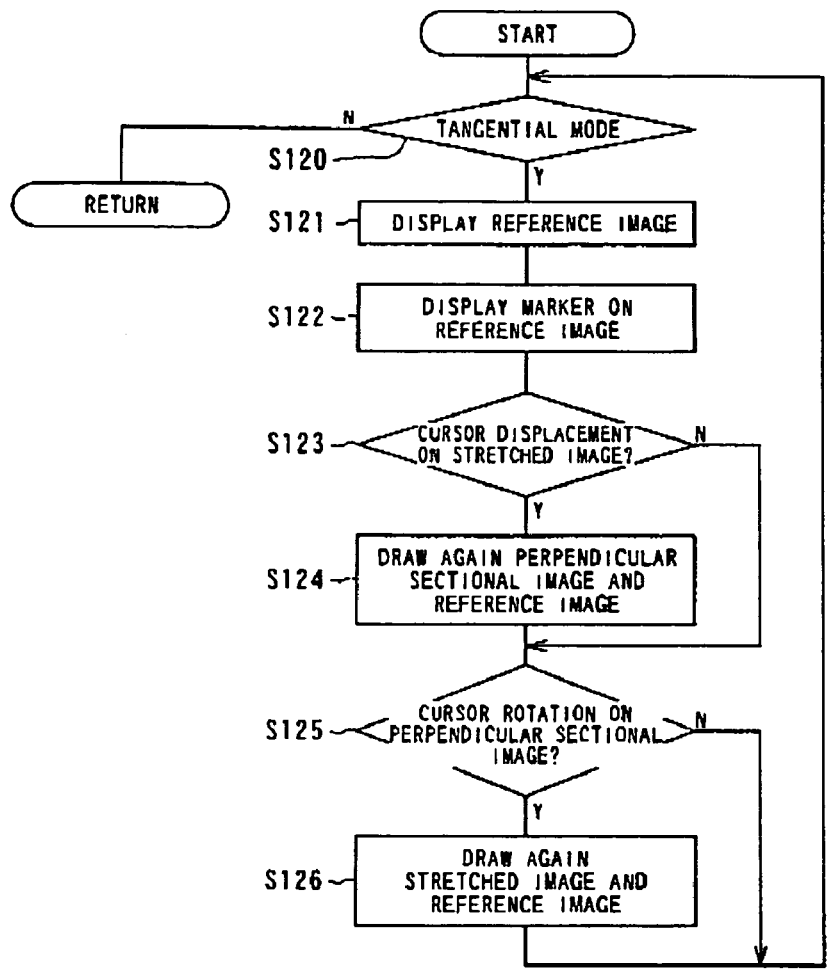
FIG. 19 is a flowchart for explaining an outline of processing of the interlocking display in a second variation of the first embodiment.

When the operator performs a mode changing operation for changing a display state of the above-mentioned first variation to a display state of this variation, the image processor 11 sequentially conducts the following steps in response to this, as schematically shown in FIG. 19.

The reference image is drawn again on the primary screen (FIG. 19, steps S120 and S121). An axis is set as follows upon displaying the above. In the state prior to this mode change, the perpendicular sectional image at a cursor bar position $t_1$ of the vessel stretched image is displayed. The vectors in the axial direction of this image are represented by e, $t(t_1)$, and $u(t_1)$, and the vectors of axes of the vessel stretched image are expressed by $e'(t_1)$, $t(t_1)$, and $u'(t_1)$. The reference image is drawn by setting a first axis directed toward the right on the screen in the direction of $e'(t_1)$, a second directed downward on the screen in the direction of $t(t_1)$, and a third axis directed toward the depth of the screen in the direction of $u'(t_1)$. Any of the MIP image, the volume-rendering image, and the flat reformatted image may be selected and displayed by operator's operation on the primary screen.

Figure 20:
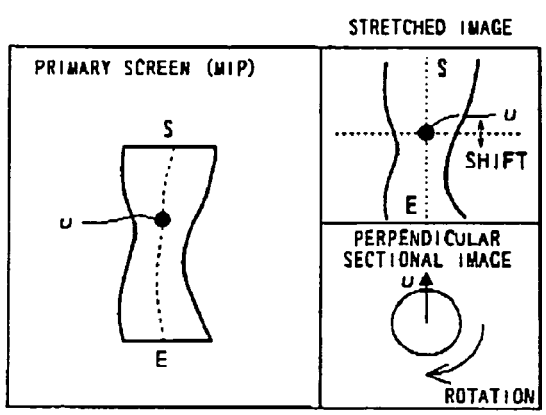
FIG. 20 illustrates a screen for explaining the interlocking display in the second variation.

Then, a marker is displayed at a position corresponding to the cursor bar of the vessel stretched image on the reference image of the primary screen (step S122). As a result, for example the monitor screen shown in FIG. 20 is obtained.

By moving the cursor bar CB1 position on the vessel stretched image on the straight view, the perpendicular sectional image is drawn again (i.e., re-depicted) by calculating e, $t(t_1)$, and $u(t_1)$ in the same calculation method as in the first variation, using the view direction vector v of the reference image before the mode change. And, in response to the displacement of the cursor bar CB1, the reference image is drawn again using $e'(t_1)$, $t(t_1)$, and $u'(t_1)$ as the first, second and third axes at a new position of the cursor bar CB1 (steps S123 and S124).

When rotating the cursor bar CB2 on the perpendicular sectional image, $e'(t_1)$, $t(t_1)$, and $u'(t_1)$ are calculated again by the same calculation method as in the first variation, and the vessel stretched image is drawn again (i.e., re-depicted). And the reference image is drawn again corresponding to a vector $e'(t_1)$, $t(t_1)$, and $u'(t_1)$ in response to the rotation of the cursor bar CB2 (steps S125 and S126).

Therefore, when a flat reformatted image is selected as the image on the primary screen, the section of the image on the cursor bar on the straight view completely agrees with the section of the image on a straight line extending from the marker transversely on the primary screen. Therefore, it is possible to display the same structure on the primary screen by aligning the cursor bar with a fine structure surrounding the blood vessel displayed in the vessel stretched image. It becomes therefore to accurately and easily confirm what is the structure by observing the reference image on the primary screen. Switching the primary screen from a flat reformatted image into an MIP image or a volume-rendering image is useful for accurately understanding the image by the assistance provided to this confirmation operation.

The above-mentioned interlocking display is applicable to interlocking from the rotation of the perpendicular sectional image to the reference image on the primary screen.

In other words, it is possible to rotate the screen itself in a reverse direction in place of rotating the cursor bar CB2 of the perpendicular sectional image, or to perform operation for updating the direction of the reference image of the primary screen in response thereto. When conducting this operation, if the screen is rotated anticlockwise by an angle φ, the view direction vector v is rotated around the vector t as an axis clockwise by "−φ". After this rotation, u, $t(t_1)$, $u(t_1)$, $e'(t_1)$, and $u'(t_1)$ are calculated in the same manner as in the above-mentioned first variation, using the vector v, and a vessel stretched image and a perpendicular sectional image are drawn again. The reference image is then drawn again on the basis of the above-mentioned procedure.

The operation of rotating the view direction vector as described above is also useful in the display mode of the above-mentioned first variation.

(Third Variation)

The first variation relates to a method for extracting a vessel center line, which specifies a passage point, executed by the image processor 11.

When extracting the vessel center line, it is desirable that the center line between S and E can be extracted only by specifying the starting point S and the end point E. However, when a vessel obliteration is existent between them, for example, S and E cannot automatically be connected in some cases.

Figure 21A:
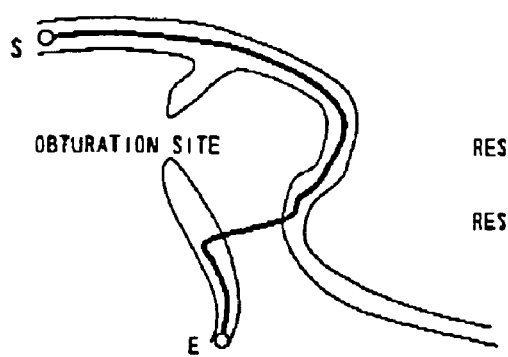
FIGS. 21A and 21B are schematic views of a blood vessel for explaining the necessity to add a center line in a third variation of the first embodiment.

This variation was developed by paying attention to this inconvenience, and is intended to permit connection between S and E by specifying an additional passage point. The case shown in FIG. 21A illustrates a state in which, because of the presence of an obliteration and branching of vessels, there is an error in extraction of the center line between S and E.

Figure 21B:
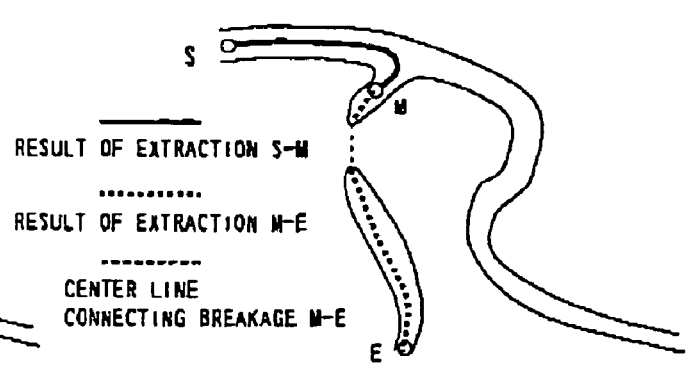

In this case, it suffices to specify a passage point M as shown in FIG. 21B, and extract the center lines between S and M and between M and E separately. The thick line shows that the correct center line between S and M is extracted. For the portion between M and E (thick broken line) in contrast, because of the presence of a complete obliteration in this portion, only parts of the center line are extracted, respectively, and M and E are not connected. In this case, the image processor 11 connects the two divided center lines by the shortest line (thin broken line) connecting the center line extracted from point M and the center line extracted from point E. The center line between S and E is finally determined by connecting the S-M center line and the M-E center line thus determined.

Figure 22:
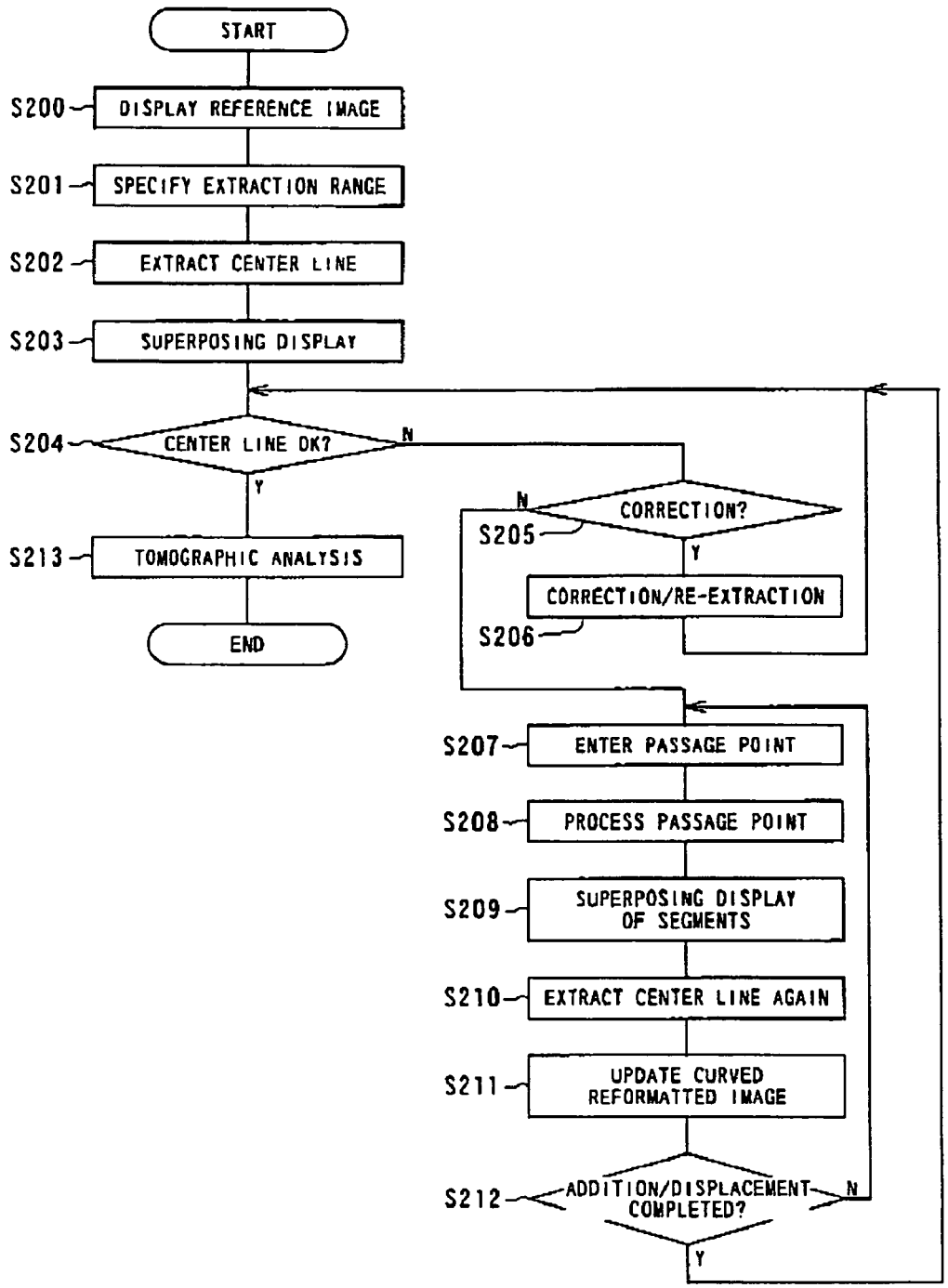
FIG. 22 is a schematic flowchart illustrating the correction processing of the center line corresponding to addition and displacement of passage points in the third variation.

This method for extracting the vessel is executed by the image processor 11 in the processing procedure shown in FIG. 22.

More specifically, the image processor 11 prepares, as described above, a volume-rendering image, an MIP image, or a flat reformatted image from three-dimensional image data of the patient, and displays the prepared image on the primary screen as a reference image. The image processor 11 prepares a curved reformatted image, and displays the prepared image simultaneously with the above, as a confirmation image side by side on the primary screen (FIG. 22, step S200; see for example FIGS. 5 and 6 described above). The curved reformatted image may also be used as a reference image. As a confirmation image, the vessel stretched image may be used in place of the curved reformatted image.

Then, the image processor 11 accepts the specification of points S and E specifying the extraction range of vessels received from the operator via the input unit 14 (step S201), and extracts and displays the vessel center lines within the ranges of points S and E on the basis of this specified point information (step S202).

The image processor 11 displays the extracted vessel center line in superposition on the MIP image, the VR (volume-rendering) image, or the flat reformatted image serving as a reference image, and on the curved reformatted image serving as a confirmation image (step S203).

Then, the image processor 11 changes the sectional position, sectional direction, or the view direction of the reference image displayed in superposition, interactively in response to operator's operation. The operator determines whether or not the extracted vessel center line is appropriate from the state of display of the reference image and the confirmation image, using this interface function (step S204).

When information that the extracting condition of the vessel center line is determined to be proper is received from the operator, it becomes possible to properly carry out extraction of vessel walls or analysis of the vessel stenosis ratio using this vessel center line (step S213 described later).

On the other hand, when information that the vessel center line is not appropriate is received from the operator, the image processor 11 may instruct the operator to manually make a correction on the screen (step S205 and S206), or retry extraction of the vessel center line by adding a passage point of the vessel center line (S205, S207 to S211).

When extracting the vessel center line again, the image processor 11 enters information about the passage point provided by the operator via the input unit 14 (step S207), carries out processing of the sequential relationship of the new passage point with those already specified (step S208), and prepares and displays lines connecting the passage points (step S209). The image processor 11 determines the necessity to add or move the passage points (step S210), and as required, repeats the processing of steps S207 to 209. If not necessary, vessel center lines are extracted again on the basis of the updated information on the passage points (step S211, returns the process to step S204, and repeats the above-mentioned processing.

The addition and moving processing of the passage points will be described with reference to the following cases.

When the re-extracting operation of passage points is selected, a point specified by the operator using the input unit 14 on the reference image on the primary screen is additionally entered as a passage point M1 (step S207).

Figures 23A, 23B:
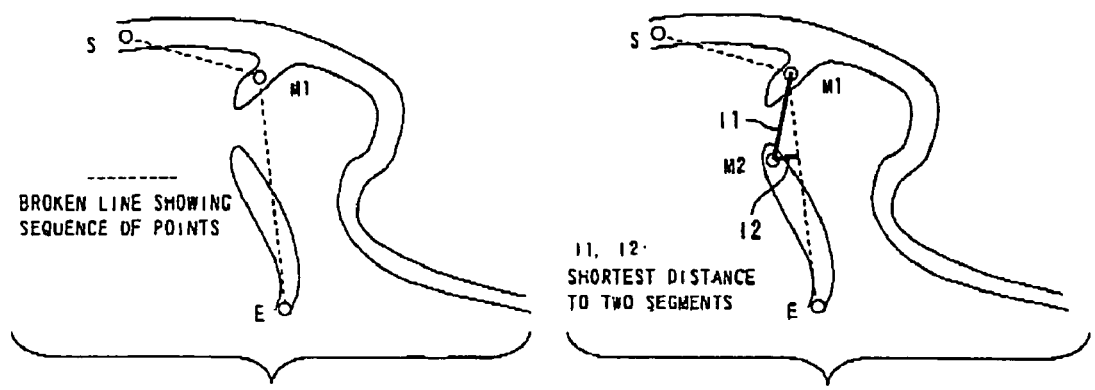
FIGS. 23A and 23B are schematic views of blood vessel for explaining the addition of passage points in the third variation.

When a passage point is entered, a sequential relationship S-M1-E is set, and two dotted lines S-M1 and M1-E are displayed so as to enable the operator to confirm the sequential relationship (steps S208 and S209; see FIG. 23A).

When another passage point is set (M2), the shortest distances 11 and 12 from the two lines to point M2 are calculated, and a new passage point M2 is added between the lines of the shortest distance (steps S207 to S209; see FIG. 23B). In the case of FIG. 23B, in which the line between M1 and E is less distant, the sequential relationship of points is S-M1-M2-E. When a passage point is added to a line not intended by the operator, the added point is deleted. The point is added near the line satisfying the correct sequential relationship (line between M1 and M2), and an operation for moving this point to a desired position is interactively carried out.

Subsequently, when the operator presses the "re-extraction button" on the screen, for example, the image processor 11 executes re-extraction of the vessel center line (step S210).

In the re-extraction, more specifically, the image processor 11 derives all sets of two points from the set sequential relationship. In this case, they include three sets S-M1, M1-M2, and M2-E. Then, a vessel center line is extracted from each of these three sets. Upon extraction, when two lines extending from both end points are not connected, they are connected into one line by connecting the nearest points of these lines. A single vessel center line between S and E is prepared by connecting the three extracted vessel center lines, and the superposing display so far effective is changed.

When a new passage point is set on the reference image as described above, the image processor 11 updates the curved reformatted image serving as the confirmation image in response to the latest vessel center line (step S211). This makes it possible to observe the change in the curved reformatted image resulting from this passage point processing substantially in a real-time manner during the addition of a new passage point and the positional connection thereof.

Subsequently, the image processor 11 asks the operator whether or not the addition of the passage point and the positional correction thereof have been completed (step S212). When the operation is not determined to have been completed, the process is returned to step S207, and if the operation is determined to have been completed, the process is returned to step S204.

As a result, the operator can carry out confirmation again as to whether or not the vessel center line is properly extracted (step S204). The above-mentioned series of operations can be repeated until the vessel center line is properly extracted, or the vessel center line is manually connected into a proper center line, or the extracting operation itself of the vessel center line is cancelled. That is, when it is determined by the operator that the vessel center line has not been properly extracted, the vessel center line can be corrected and re-extracted as described above.

In contrast, when it is determined by the operator that the vessel center line has been properly extracted, the image processor 11 allows various analyzing processes of the vessel shape (step S213).

As described above, the vessel center line can be extracted stably at a high accuracy only through simple additional specification of a few passage points by providing an automatic correction mechanism of vessel center lines in response to the addition of passage points and the positional correction thereof. As a result, the burden is largely alleviated as compared with the manual correction of the vessel center line.

Second Embodiment

A second embodiment of the processor for analyzing a tubular structure of the present invention will be described with reference to FIGS. 24 to 33.

This embodiment provides a processor for analyzing a tubular structure which permits efficient identification of the sectional shape in the three-dimensional display of a vessel image, particularly observation of portions around a stenosis site and the position in the whole blood vessels. More specifically, the processor for analysis has a function permitting correction of the contour of an extracted area in a vessel stretched image, a straight view, and a perpendicular sectional image, a perpendicular view; a function to display in parallel a stenosis ratio curve on the vessel stretched image; a function to cut an area to be analyzed and three-dimensionally display the cut area; a jumping function of the image display position, and a parametric display function.

The processor for analyzing a tubular structure in this embodiment has the same hardware configuration as that shown in FIG. 1.

Figure 24:
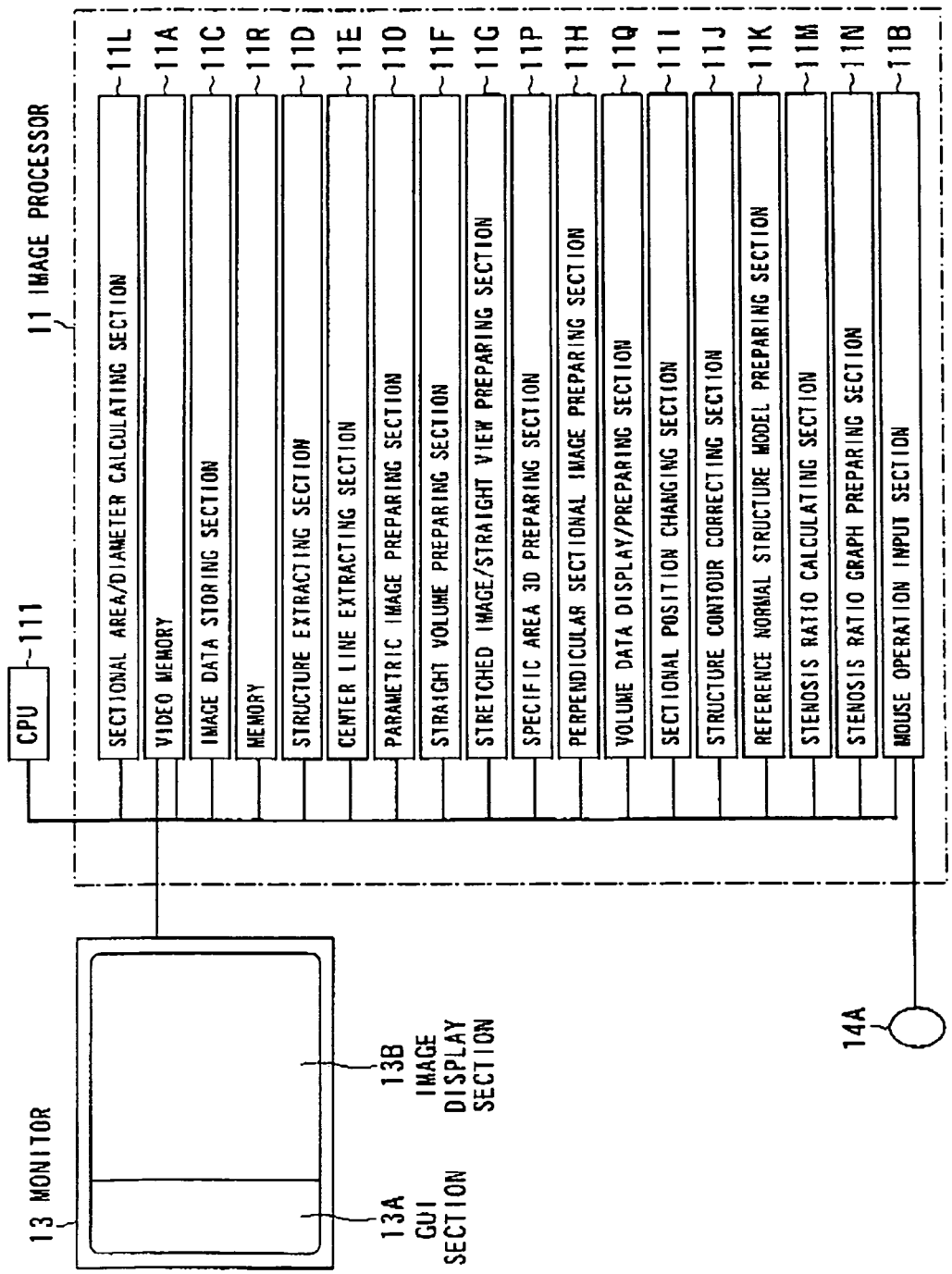
FIG. 24 is a functional block diagram for explaining a second embodiment of the analyzing processor of a tubular structure of the present invention.

Various components relating to processing in this embodiment (including functional units) will be described with reference to FIG. 24.

A display unit 13 provides a monitor display screen. A GUI (Graphical User Interface) section 13A and an image display unit 13B are displayed on the screen. This makes it possible for the display unit 13B to display image data stored in a video memory 11A provided in the image processor 11. The GUI section 13A has various buttons for operating the processor for analysis arranged therein, and is operated by means of a mouse 14A provided as a part of an input unit 14.

On the other hand, the image processor 11 has hardware components such as a CPU 111, a memory 11R, and a video memory 11A. Among others, the CPU 111 reads out a processing program stored in advance in a memory 12 and processes three-dimensional image data on the basis of this processing program, thereby giving various functions shown in FIG. 24 to the image processor 11.

The image processor 11 takes charge of image processing and functionally has:
  Mouse operation input processing section 11B
  Image data storing section 11C
  Structure extracting section 11D
  Center line extracting section 11E
  Straight volume preparing section 11F
  Vessel stretched image preparing section 11G
  Perpendicular sectional image preparing section 11H
  Sectional position changing section 11I
  Tubular structure contour correcting section 11J
  Reference normal tubular structure model preparing section 11K
  Sectional area/diameter calculating section 11L
  Stenosis ratio calculating section 11M
  Stenosis ratio curve preparing section 11N
  Parametric image preparing section 11O
  Specific area three-dimensional drawing section 11P
  Volume data display preparing section 11Q

Among these component sections, the mouse operation input processing section 11B performs data processing regarding operations on the monitor display screen conducted by the operator via the mouse 14A.

The image data storing section 11C stores three-dimensional image data read out from the memory 12. The three-dimensional image data (volume image data) manages sectional images perpendicular to the body axis direction in positional sequence along the body axis, which are managed together with information showing the human body direction in the volume image data.

The tubular structure extracting section 11D extracts image data of the tubular structures such as blood vessels from the volume image data by a desired area extracting method. The applicable area extracting methods include, for example, a technique for automatically extracting three-dimensional blood vessels and blood clot areas from X-ray CT angiographic images developed by Marko Subasic et al. (see reference "3-D Image analysis of abdominal aortic aneurysm" Medical Imaging 2001: Image Processing, Proceedings of SPIE, vol. 4322 (2001), p. 388-394). The extracted vessel areas are stored in the memory 11R as tubular structure models (surface models having an apex of a sampling point on the contour). Other technique may be used in place of the above-mentioned extraction method.

The center line extracting section 11E extracts center lines in an extracted three-dimensional vessel area. The applicable methods for extracting center lines include, for example, the technique for automatically extracting three-dimensionally vessel center lines from an X-ray CT angiographic image, developed by Onno Wink et al. (see reference "Fast Delineation and Visualization of Vessel in 3-D Angiography Images" IEEE Transactions on Medical Imaging, vol. 19, no. 4, April 2000). Other technique may be applied in place of this center line extracting method.

Figure 25:
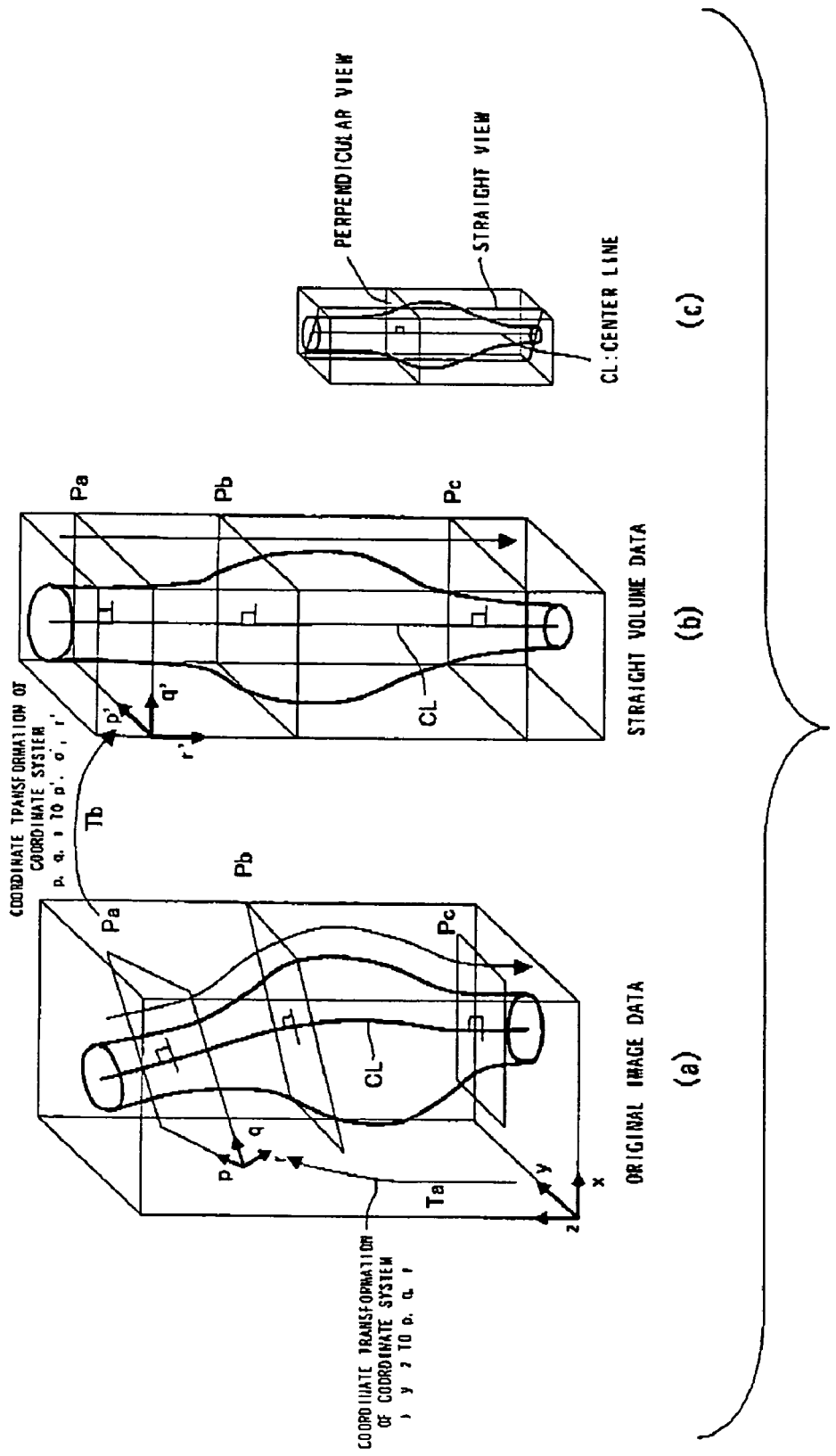
FIG. 25 illustrates the straight volume preparation processing executed in the second embodiment.

The straight volume preparing section 11F reconstructs the volume data by piling up sectional images perpendicular to the vessel center line CL so that the vessel center line CL becomes straight as shown in FIG. 25. The sectional images are piled up, on the basis of human body directional information of the image data stored in the image data storing section 11C, so that, as the reference direction, the direction from chest to back of the human body is directed upward of the sectional images. The data prepared as described above is hereinafter referred to as "straight volume data".

The vessel stretched image preparing section 11G prepares a sectional image including a vessel center line from straight volume data (straight view; see FIG. 25C). Particularly, it prepares a sectional image at a position specified by the position changing section 11I.

The perpendicular sectional image preparing section 11H prepares a sectional view perpendicular to the vessel center line in the straight volume data (perpendicular view; see FIG. 25C). Particularly, it prepares a sectional view at a position specified by the sectional position changing section 11I.

Figure 26:
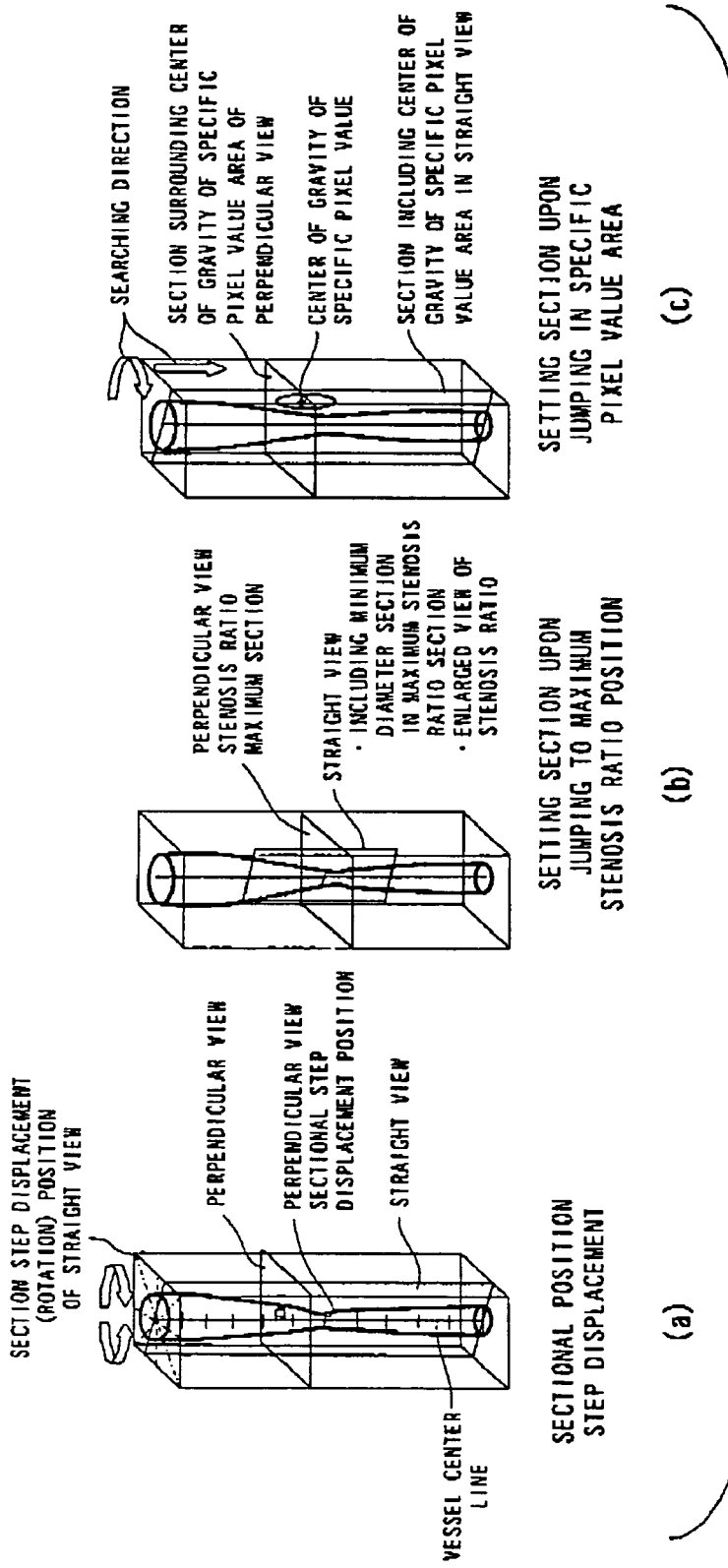
FIG. 26 illustrates a change in sectional position of the straight view and the perpendicular view, executed in the second embodiment.

As shown in FIG. 26, the sectional position changing section 11I can determine the sectional position where it generates a vessel stretched image/perpendicular sectional image, in response to operators operation. More specifically, this section has a step sectional displacement mode, and in this displacement mode, can change the sectional position at a set step value (an angle rotating around the vessel center line for the straight view; distance or a number of boxels along the vessel center line for the perpendicular view).

The sectional position changing section 11I has a jumping mode to a maximum position of the stenosis ratio curve calculated by the stenosis ratio calculating section 11M. In this jumping mode, when the operator performs the jumping instructing operation, this section displays the maximum stenosis ratio position at the center of the straight view, and automatically set an enlargement magnifications of the display of the ranges including the maximum value toward both sides covering ranges in which the stenosis ratio if at least a certain value, as the display range of the straight view. The straight view is a section having the maximum value of stenosis ratio, and is set on a section passing through the minimum diameter. In this case, the sectional image at a position having the maximum value of stenosis ratio is displayed on the perpendicular sectional image, a perpendicular view.

The center position of the straight view and the sectional position of the perpendicular view may be set using a curve of the vessel sectional area or diameter, in place of the stenosis ratio curve. However, when using the sectional area or the diameter, the position of the minimum or maximum value of the curve should be adopted as the jumping position. The maximum value should be selected in the case of aneurysm or the like, and the minimum value, in the case of stenosis.

The sectional position changing section 11I has a mode in which, when setting a particular pixel value from the window specifying a specific pixel value set in the GUI section 13A, the process jumps to a section including the area having that pixel value (for example, the calcification area or the soft plaque area). When the operator conducts such a jumping instruction operation, this section searches for a section of the straight view/perpendicular view having an area including the specified pixel value for each of the direction of rotation around the vessel center line and the direction along the vessel center line, with a stepping value set currently in the stepping displacement mode, and generates such section on the display section. The reference position of jumping shall be the position of center of gravity of the area having the specific pixel value. The priority of search is, for example, in a direction from the center to terminal of vessels, and then in the clockwise direction around the center line.

Figure 27:
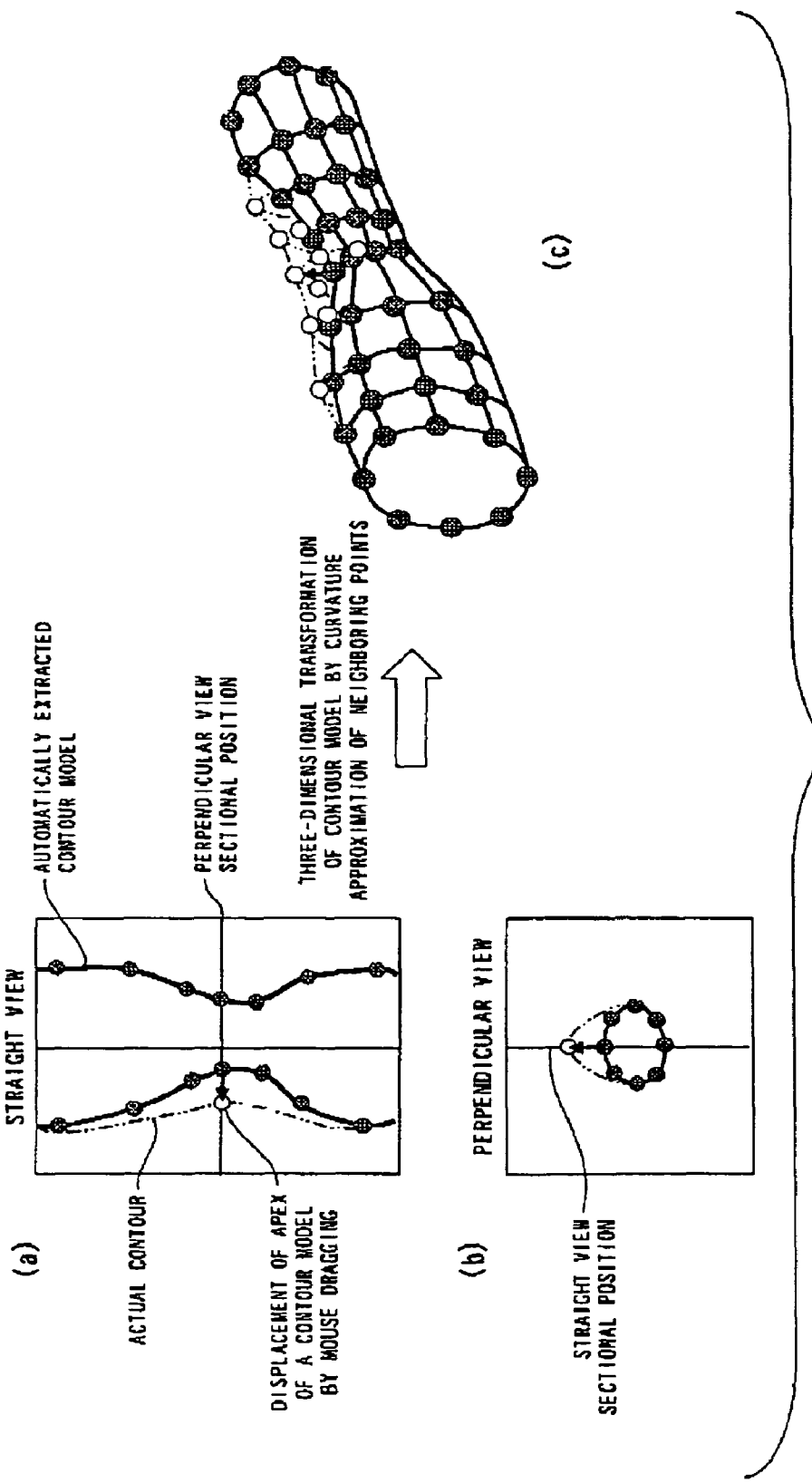
FIG. 27 illustrates the correction processing of the contour extracted from the tubular structure, executed in the second embodiment.

As shown in FIG. 27, the structure contour correcting section 11J displays the contour of a tubular structure contour model extracted by the structure extracting section 11D in superposition on the vessel stretched image and the perpendicular sectional image, and writes it into the video memory 11A. The section changes the displayed contour in response to operator's operation. The tubular structure contour model has a sampling point on the contour as the apex. By dragging this apex with the mouse 14A, the apex moves on the sectional plane in response to the operation. The neighboring apices in the three-dimensional space of the displaced apex also move onto approximation curves connecting the neighboring apices, thereby permitting correction of the tubular structure contour model. The structure contour correcting section 11J rewrites data of the video memory 11A so that the result of correction is reflected also in the tubular structure contour models displayed in superposition on the vessel stretched image and the perpendicular sectional image, respectively.

The sectional area/diameter calculating section 11L has a function to calculate the sectional area of a section perpendicular to the vessel center line, and the diameter and the radius passing through the vessel center line on the basis of the tubular structure contour model.

The hypothetical normal structure model preparing section 11K has a function to prepare data of a model in a hypothetical normal state of a tubular structure (hypothetical normal structure model). Specifically, as show in FIG. 32, this preparing section 11K approximates a graph drawn by plotting values of distance (radius) of the apex of the tubular structure contour model (sampling point on the contour) from the vessel center line by means of the regression line. Then, sampling points lower than the regression line are erased. As a result, this processing is repeated until the sum of relative square error between the radius and the regression line at the remaining sampling points (value of diameter–regression line at the sampling point)$^2$/(sampling point diameter)$^2$ becomes smaller than a certain threshold value, and the radius is determined again from the regression line. Then, a hypothetical normal tubular structure model is prepared by moving the apex position in the radial direction in response to the re-determined radius. The regression line may be a regression curve.

The stenosis ratio calculating section 11M calculates the stenosis ratio of the tubular structure on the basis of the sectional shapes of the structure contour model and the hypothetical normal structure model.

The area Aa of the section a of the structure contour model on the perpendicular view, and the area Ab of the section b of the hypothetical normal tubular structure model on the perpendicular view are determined. The stenosis ratio calculating section 11M calculates the stenosis ratio in accordance with the formula (Ab−Aa)/Ab×100(%) using these area values. The value of (Db−Da)/Db×100(%) may be calculated as a stenosis ratio by determining the minimum diameter (Da) of the section A and the diameter at a position corresponding on the section b or the average diameter (Db).

The stenosis ratio curve preparing section 11N prepares a stenosis ratio curve by plotting the stenosis ratio calculated by the stenosis ratio calculating section 11M in a direction along the vessel center line. The stenosis ratio curve is written into the video memory 11A so as to display the curve in correspondence to the straight view (see FIG. 31).

Figure 28:
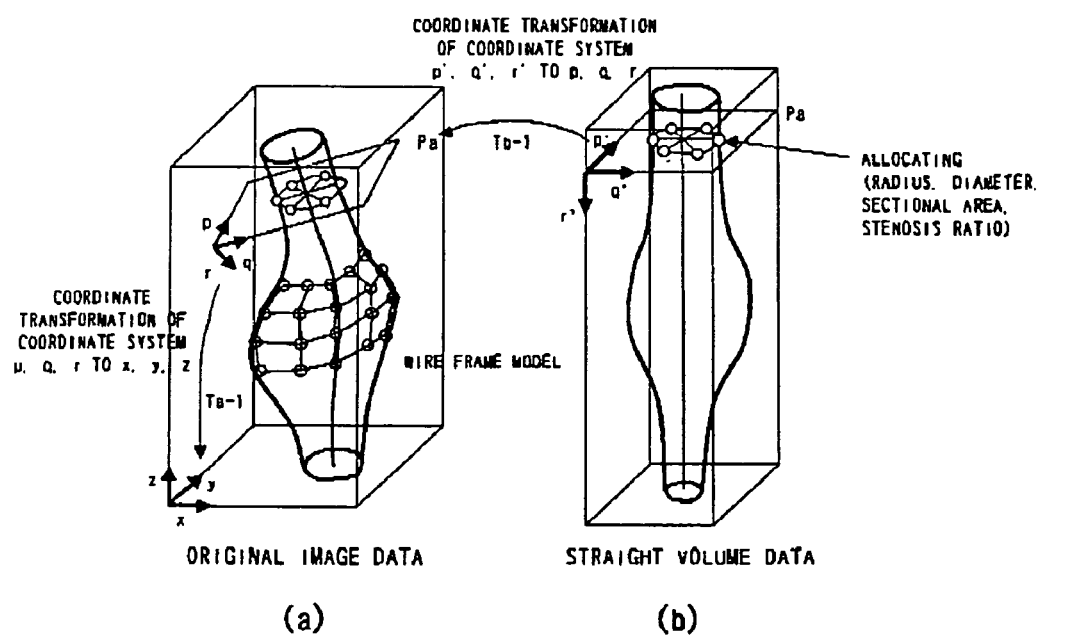
FIG. 28 illustrates the preparation processing of a parametric image executed in the second embodiment.

The function of the parametric image preparing section 11O will now be described with reference to FIG. 28. The parametric image preparing section 11O builds a wire frame model having joints obtained from the points resulting from conversion of the apices of the structure contour model in the straight volume onto the coordinate system of the original image data. The radius, the diameter, the sectional area, or the stenosis ratio of the structure model on the perpendicular view is allocated to each joint.

Joints are added at the average coordinate positions over four neighboring joints until the distance between joints of the wire frame becomes smaller than a certain threshold value. The values (radius, diameter, sectional area, or stenosis ratio) allocated to adjacent joints are interpolated in response to the joint distance and the result is allocated to the added joints (this is referred to as the "parametric model).

The parametric image preparing section 11O has a configuration so as to perform three-dimensional display of the tubular structure using the parametric model prepared as described above. Upon this display, the preparing section 11O prepares display image data so as to change the surface color in response to the allocated values to the joints. The data may be prepared so as to display a surface having a joint exceeding a certain threshold value in red, or the display image may be prepared, for example, in colors having continuous gradations from blue to red. An image prepared as described above is referred to as a parametric image. When executing gradation display, it is desirable to prepare also a color bar displayed on the display image to ensure visual correspondence between the color and the value.

These various manners of display are applicable also to the three-dimensional display of a specific area described later and the display of a tubular structure of volume data display. In the volume data display, the value of the parameter should preferably be annotation-displayed.

Figure 30:
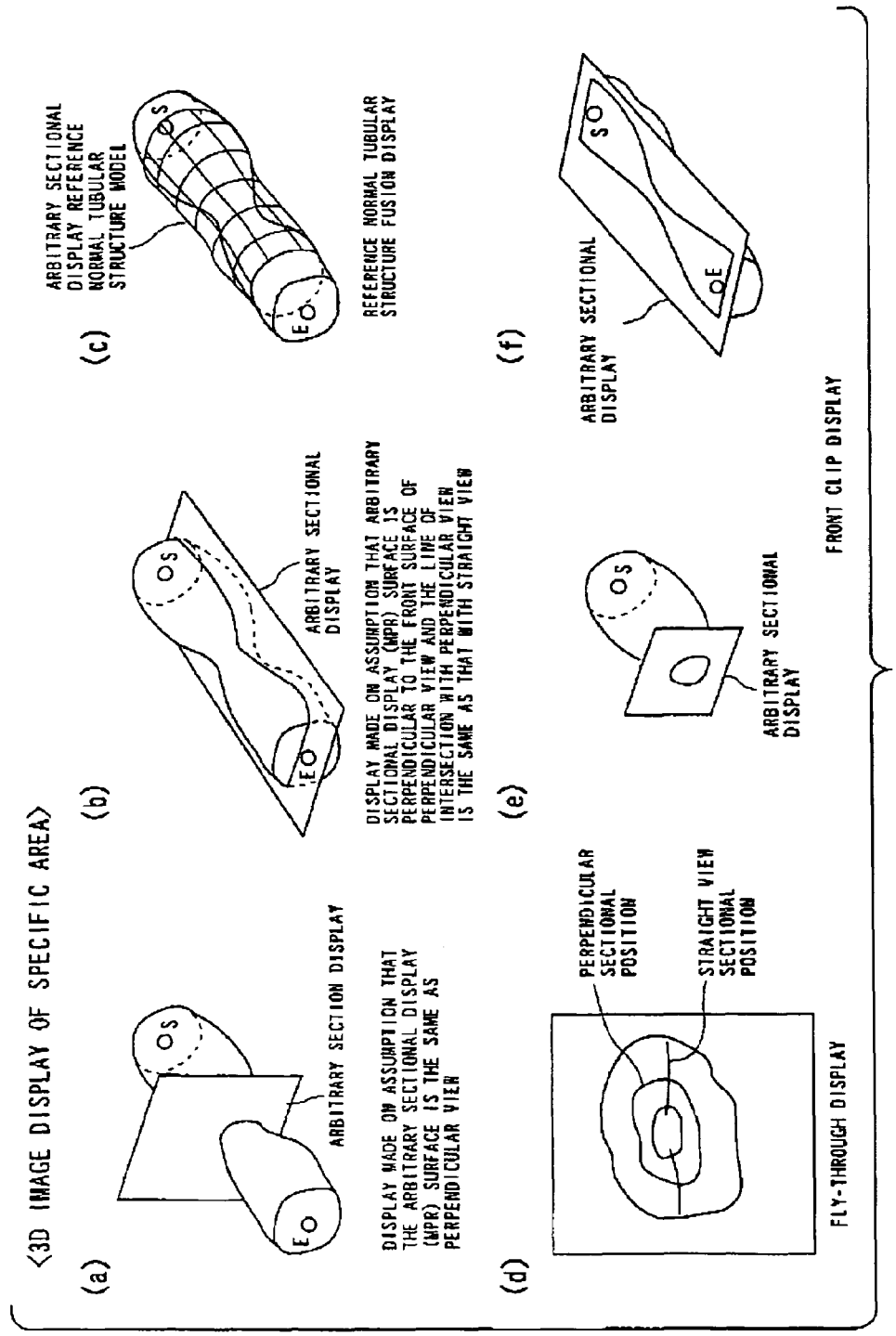
FIG. 30 illustrates the display of a specific-area three-dimensional image, executed in the second embodiment.

The function of the specific area three-dimensional preparation section 11P will now be described with reference to FIG. 30. The specific area three-dimensional preparation section 11P has a function to perform three-dimensional display of the original volume image data corresponding to the range displayed on the straight view. In this three-dimensional display, a conventionally known arbitrary sectional image and a pseudo three-dimensional display (volume-rendering or surface-rendering) may be combined in fusion (see FIGS. 30A and 30B). This makes it possible to conduct general operations such as capacity setting in the three-dimensional display, image rotation, change in enlargement ratio, and panning.

The arbitrary sectional image in this case is prepared as a section at the sectional position of the straight view (usually forming a curved surface when the vessel is bent), at the sectional position of the perpendicular view, or as a section in the tangential direction of the vessel center line. That is, when changing the sectional position of the straight view and the perpendicular view, the arbitrary sectional position is also changed.

When the position of the arbitrary section is changed in this specific area three-dimensional display, the sectional positions of the straight view and the perpendicular view may be set so as to be changed in conjunction.

Setting may permit front clip display using the arbitrary section as a clip surface (see FIG. 30E). The hypothetical normal structure model prepared by the hypothetical normal structure model preparing section 11K may be displayed in fusion in response to operator's selecting operation (see FIG. 30C). Setting may also permit "fly-through" display which prepares an image in response to a change in the starting point and the view direction by mouse operation (see FIG. 30D). The range of area to be displayed may arbitrarily specified irrespective of the display range of the straight view.

The volume data display preparing section 11Q prepares an MPR image of volume image data, a projected image of MIP or the like, or a volume-rendering image, prepares image data by superposing a graphic showing the sectional position of the perpendicular view currently displayed over that image, and writes the image data into the video memory 11A.

The memory 11R provided in the image processor 11 temporarily stores data to be processed by the processor 11. The video memory 11A stores image data prepared by the GUI section 13A and the image processing section 13B. The contents of the video memory and displayed on the monitor screen. Using the mouse 14A, the user can instruct button operation of the GUI section 13A and operation of the image displayed on the image display section 13B.

Examples of the basic image display and analysis processing executed by the processor for analyzing a tubular structure of this embodiment will now be described with reference to FIGS. 29, 31 and 33.

Figure 33:
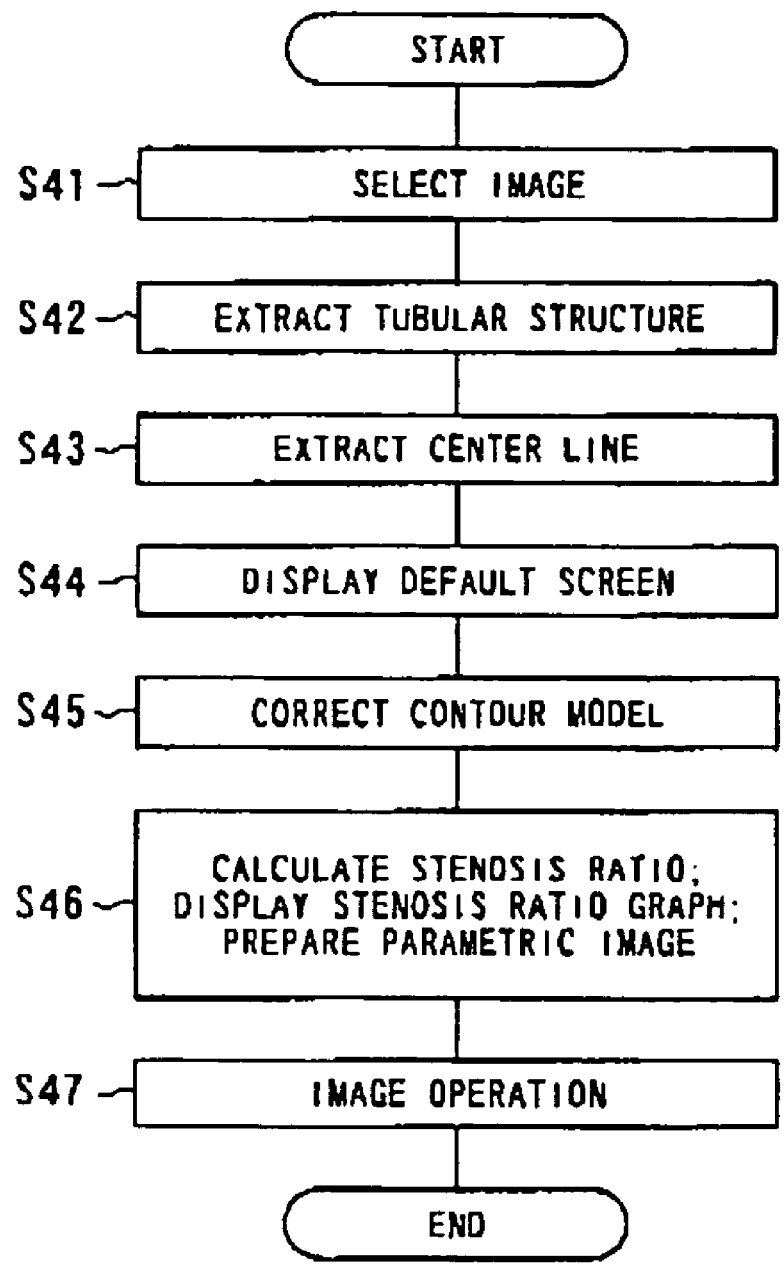
FIG. 33 is a rough flowchart explaining an outline of the display and quantitative analysis of a tubular structure, such as a blood vessel, executed in the second embodiment.

As shown in FIG. 33, the image processor 11 processes such an image display and analyzing processing in the sequence of selection of image data (step S41); extraction of a tubular structure (step S42); extraction of tubular structure center line (step S43); default image display (step S44; including vessel extended display (straight view), perpendicular sectional display (perpendicular view), volume data display, and display of specific area three-dimensional image under the default condition); correction of a tubular structure contour model (step S45); calculation of the stenosis ratio; display of stenosis ratio curve; preparation of a parametric image (step S46); and then image operation (step S47). Screen operations include the moving operation of the sectional position of the straight view and the perpendicular view; sectional jumping operation; specific area three-dimensional image operation (clipping ON/OFF); parametric display ON/OFF; parameter switching; and volume data display operation (MPR/projection/volume-rendering display switching, change in display conditions).

This will be sequentially described in detail.

The image processor 11 starts up the image selecting GUI (not shown), and displays a list of data stored in the image data storing section 11C. When the operator selects desired image data from the list, the selected data are written from, for example, the memory unit 12 into the memory 11R (step S41).

Then, the image processor 11 applies a tubular structure extraction processing to the image data written in the memory 11R by means of the structure extracting section 11D thereof, and prepares an actual tubular structure contour model (step S42).

Then, the image processor 11 extracts a vessel center line of the extracted tubular structure by means of the center line extracting section 11E (step S43).

When the preparation is ready as described above, a default image shown in FIG. 29 as an example is displayed on the image display section 13B of the monitor 13 by the image processor 11. More specifically, the straight volume preparing section 11F prepares straight volume data on the basis of the vessel center line and image data. In response to this preparation, the vessel stretched image preparing section 11G and the perpendicular sectional image preparing section 11F are started up. That is, the vessel stretched image preparing section 11G prepares a vessel stretched image, a straight view, from the straight volume data under the default sectional position and display conditions; the perpendicular sectional image preparing section 11F prepares a perpendicular sectional image, a perpendicular view; and these image data are written into the video memory 11A.

The volume data display preparing section 11Q prepares an image for volume data display of the image data under the default display conditions, and the prepared image data are written into the video memory 11A.

The specific area three-dimensional preparation section 11P prepares a three-dimensional display image for the original image data corresponding to the display range of the straight view, and the prepared image data are written into the video memory 11A.

Figure 29:
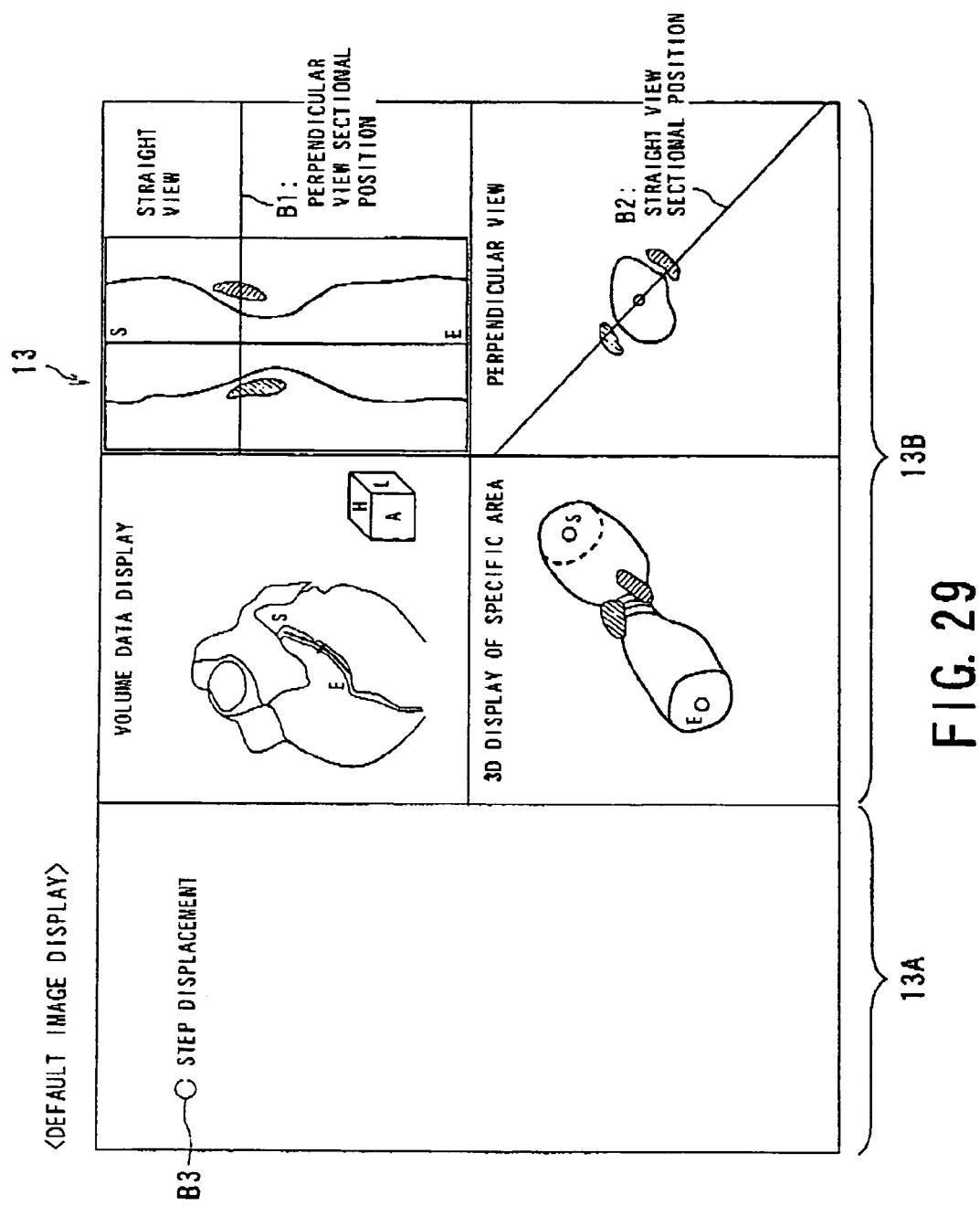
FIG. 29 illustrates an example of the default image (monitor screen) displayed in the second embodiment.

Therefore, the monitor 13 displays the image data written into the video memory 11A as a default image, for example, as shown in FIG. 29.

The image processor 11 provides the operator with a chance for manually correcting the contour of the tubular structure such as blood vessels currently displayed, via the structure contour correcting section 11J (step S45).

Specifically, the structure contour correcting section 11J writes, by means of the function thereof, contour data of the contour model of the tubular structure extended by the structure extracting section 11D into the video memory 11A, and displays the contour model in superposition over the vessel stretched image and the perpendicular sectional image, respectively. The operator who observes the superposition-displayed contour model, if desiring to correct the model issues an instruction to correct the contour to the image processor 11 (the structure contour correcting section 11J) via the mouse 14A or the like.

The contour model of the tubular structure has the sampling point on the contour as an apex. By dragging the apex with the mouse 14A, the apex can be moved on the section in response to dragging operation. Therefore, under the effect of the function of the structure contour correcting section 11J, neighboring apices in the three-dimensional space of the displaced apex automatically move in conjunction to an appropriate position on an approximation line connecting the neighboring apices, and the tubular structure contour model is thus corrected. The result of correction is also reflected in the contour image displayed in superposition over the vessel stretched image, a straight view, and the perpendicular sectional image, a perpendicular view, through rewriting processing of the image data in the video memory 11A.

The sectional positions of the straight view and the perpendicular view can be displaced individually by dragging sectional position bars B1 and B2, respectively (see FIG. 29). By clicking a step moving operation button B3, the sectional position is moved by a step amount set by the sectional position changing section 11I. Images of this sectional position and prepared by the vessel stretched image preparing section 11G and the perpendicular sectional image preparing section 11H, respectively, and the contour of the prepared structure contour model are superposed on the vessel stretched image and the perpendicular sectional image, respectively, on the monitor 13 through writing processing of the output image data in the video memory 11A by the structure contour correcting section 11J.

Figure 31:
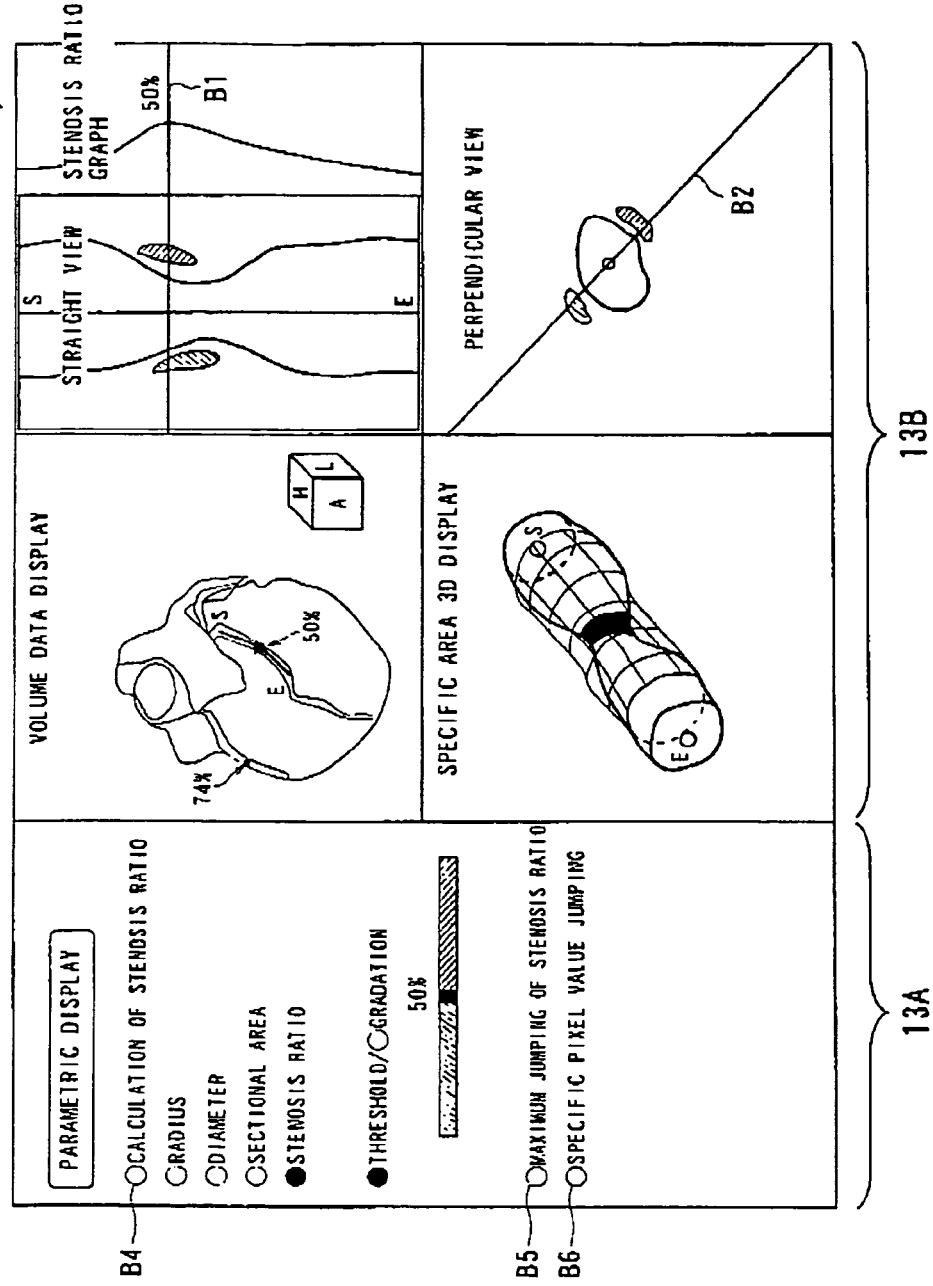
FIG. 31 illustrates the volume data display executed in the second embodiment and the parametric display in the specific-area three-dimensional display.
Figure 32:
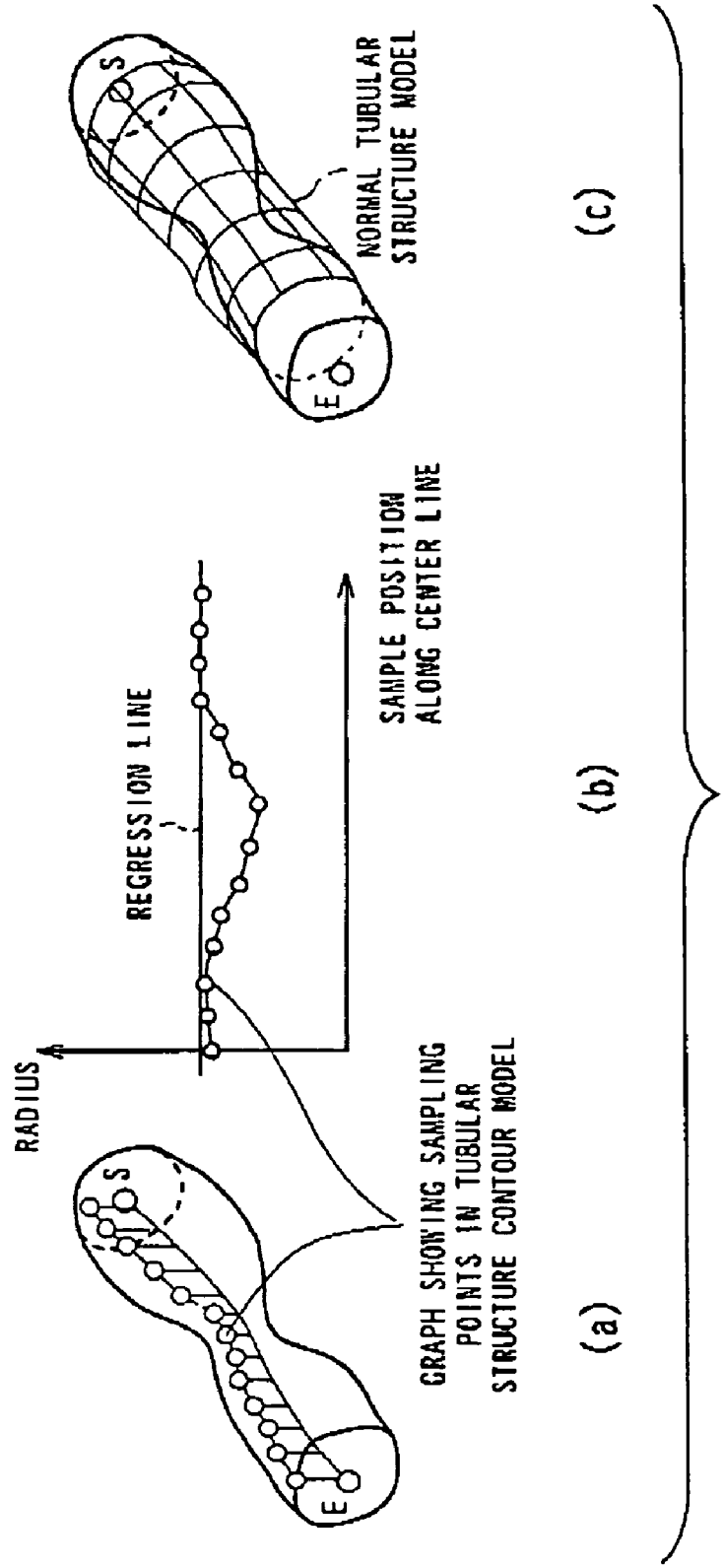
FIG. 32 illustrates preparation of a hypothetical tubular structure model in a normal state in the second embodiment.

Then, the image processor 11 executes processing of stenosis ratio calculation, stenosis ratio curve display, and preparation of a parameter image (step S46; see FIG. 31).

Specifically, when the operator clicks a "stenosis ratio calculating button B4", the hypothetical normal structure model preparing section 11K prepares, under the effect of functions thereof, a hypothetical normal structure model on the basis of already actually available structure contour model such as that of the blood vessel.

As a result, the stenosis ratio calculating section 11M calculates, under the effect of the function thereof, the stenosis ratio of the tubular structure from sectional shapes of the actual structure contour model and the hypothetical normal structure model. The stenosis ratio on the section of the currently displayed perpendicular view is displayed in superposition on the perpendicular view via data writing into the video memory 11A.

By use of the function thereof, the stenosis ratio curve preparing section 11N prepares stenosis ratio data obtained by plotting the stenosis ratios calculated by the stenosis ratio calculating section 11M in a direction along the vessel center line. Data of the stenosis ratio curve is written into the video memory 11A so as to display the data in correspondence to the vessel stretched image, and as shown in FIG. 31, displayed on the monitor 13.

The parametric image preparing section 11O prepares the above-mentioned parametric model by use of the function thereof, and stores the model in the memory 11R.

Thereafter, the image processor 11 enables the operator to conduct various image operations (step S47). These operations will now be described for the individual kinds.

<A: Moving Operation of Sectional Position of Straight View and Perpendicular View>

The operator can move "sectional position bar" B2 and B1 representing the sectional position of the straight view and the perpendicular view by dragging them on the images. In response to this, the sectional position is changed by the sectional position changing section 11I, and in response to this change, image data of the changed sectional positions are prepared by the vessel stretched image preparing section 11G and the perpendicular sectional image preparing section 11H, and written into the video memory 11A. In response to the above-mentioned change in the sectional position, the arbitrary sectional position is changed by the specific area three-dimensional image preparing section 11P, and image data at the sectional position thereof are prepared. These image data are also written into the video memory 11A. The image data written into the video memory 11A are read out every certain period of time and displayed on the monitor 13. When the sectional position of the perpendicular view has been changed, the volume data display preparing section 11Q prepares data obtained by superposing a graphic showing the updated sectional position of the perpendicular view, and such image data are displayed on the monitor 13 via data rewriting processing to the video memory 11A.

In this section operation, there occurs a jumping operation of the section to the maximum position of the stenosis ratio, or a jumping operation to a section having a specific pixel value. More specifically, when clicking a "maximum stenosis ratio jump" key B5, or a "specific pixel value jump" key B6, it is possible to cause jumping at a time of the sectional position as described above. With this jumping operation at this sectional position, the image display is automatically updated in conjunction. Jumping to the next position can be caused every time the key B5 or B6 is clicked.

<B. Specific Area Three-Dimensional Image Operation>

In this specific area three-dimensional image operation, several kinds of operation as described below are made possible.

(B1) Mode Selection of Arbitrary Section Display

The operator can select an arbitrary sectional position for specific three-dimensional display from the sectional position of the straight view, the sectional position of the perpendicular view, and the tangential section of the vessel center line via the GUI section 13A. The specific area three-dimensional preparation section 11P prepares an image in response to such a selection and transfers the prepared image to the video memory 11A. The contents stored in the video memory 11A are therefore displayed on the monitor 13. When the tangential section of the center line is selected, a section perpendicular to the section of the perpendicular view, having the same line of intersection with the perpendicular view as that with the straight view is set.

(B2) Fusion Display of Hypothetical Normal Structure

The operator an select the hypothetical normal structure model display mode via the GUI section 13A. In response to this selection, the specific area three-dimensional preparation section 11P prepares an image of the hypothetical normal structure model in fusion, and the image data is transferred to the video memory and displayed on the monitor 13.

(B3) Fly-Through Display

The operator can select the fly-through display mode via the GUI section 13A. In response to this selection, the specific area three-dimensional preparation section 11P prepares an image based on a change in the starting point and the view direction by mouse operation. The prepared image data is written into the video memory 11A and displayed on the monitor 13.

(B4) Front Clip Display

The operator can select the front clip display mode using the GUI section 13A. Upon this selection, the specific area three-dimensional preparation section 11P prepares a front clip image having an arbitrary section serving as a clip surface. The prepared image data is displayed on the monitor 13 through writing into the video memory 11A.

<C: Parametric Display>

The parametric display will now be described. When the operator turns on the toggle key "parametric display" via the GUI section 13A, the parametric image preparing section 11O prepares an image obtained by switching over the display of the tubular structure in the volume data display and a specific area three-dimensional display into a parametric image on the basis of the above-mentioned parametric model. This image data is transferred to the monitor 13 via the video memory 11A and displayed.

In this case, the operator can arbitrarily select a parameter (radius/diameter/sectional area/stenosis ratio) by means of the GUI section 13A (see FIG. 31). In response to this selection, the parametric image preparing section 11O prepares and updates the image. In response to the selection of any of the threshold value display and the gradation display performed to the GUI section 13A, the image is similarly prepared and updated (see FIG. 31). When selecting the gradation display, a color bar is simultaneously prepared. Data of this color bar is also transferred to the video memory 11A together with the prepared image, and displayed. When selecting the threshold value display, a threshold value setting slider bar (see FIG. 31) can be operated to instruct for portions exceeding the threshold value specified with this bar to become red in color. The parametric image preparing section 11O prepares image data so that the surface color changes in response to this, which is transferred to the video memory 11A and displayed on the monitor 13.

<D. Volume Data Display Operation>

In response to operator's selection, the function of the volume data display preparing section 11Q is activated, and prepares a projected image such as an MPR image or an MIP image of the volume image data, or a volume-rendering image. Data resulting from superposition of a graphic showing the sectional position of the currently displayed perpendicular view on the thus prepared image is prepared, and displayed on the monitor 13 via writing into the video memory 11A.

According to this embodiment, as described above, the operator can easily perform correction of the contour of the tubular structure area extended for quantitative analysis. He (she) can determine the image display position by comparing the stenosis ratios of tubular structures such as blood vessels. Since an area to be analyzed is cut and a three-dimensional image thereof is displaced, a higher-speed data processing is ensured.

On the other hand, image display at the target position can be automatically accomplished from the stenosis ratio, sectional area in curvature of the diameter of the tubular structure. The tubular structure is displayed in colors depending upon stenosis ratio, diameter or sectional area. The three-dimensional structure of such a structure can therefore be identified more simply and reliably. Compared with the conventional art, therefore, a tubular structure can be grasped more easily in a three-dimensional manner. As a result, improvement of the diagnostic accuracy can be expected, and it is possible to reliably alleviate the burden imposed on the operator such as a physician.

Third Embodiment

A third embodiment of the processor for analyzing a tubular structure of the present invention will now be described with reference to FIGS. 34 to 40.

This embodiment is intended to permit identification of the sectional shape in the three-dimensional display of a vessel image, particularly, easy and accurate identification of the three-dimensional secular change in lumps in the blood vessel to improve the accuracy determination of adaptability to surgery. The processor for analyzing of this embodiment is schematically based on the process comprising the steps of extracting the vessel center line and vessel areas (including blood vessel lumens and blood clot site) from present and past three-dimensional image data; specifying the measuring range; specifying branching position serving as a reference before and after the measuring range and aligning the positions; and carrying out a quantitative analysis and display of the result of analysis regarding lumps on the basis of images of the vessel areas in this state.

The processor for analyzing a tubular structure of this embodiment has the same hardware configuration as that illustrated in the above-mentioned FIG. 1, as in the second embodiment. Therefore, the image processor 11 reads out an operating program stored in advance in the memory unit 12, and displays the functions shown in FIG. 34 by processing three-dimensional image data on the basis of this operating program.

Figure 34:
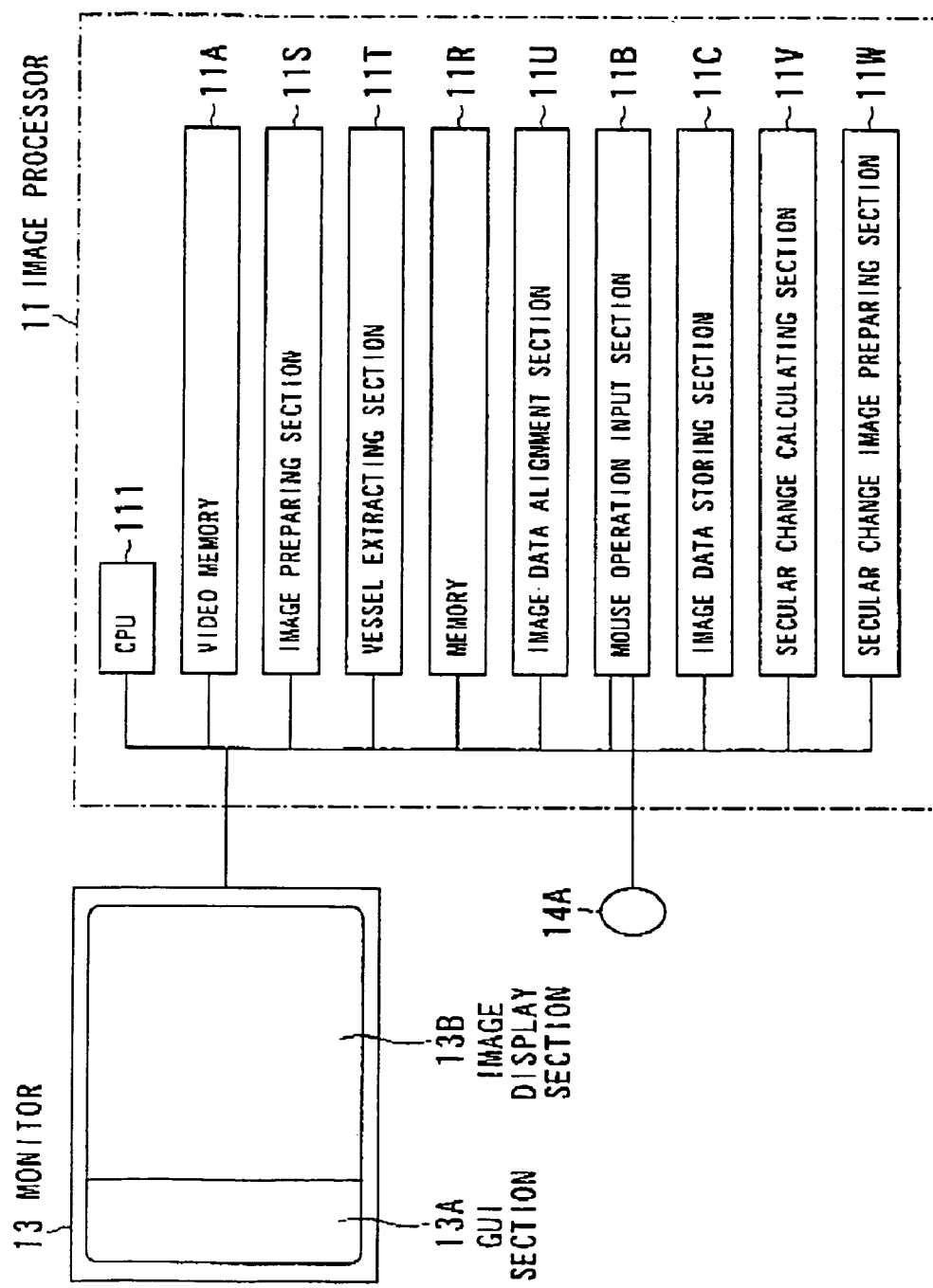
FIG. 34 is a functional block diagram for explaining a third embodiment of the processor for analyzing a tubular structure of the present invention.
Figure 35:
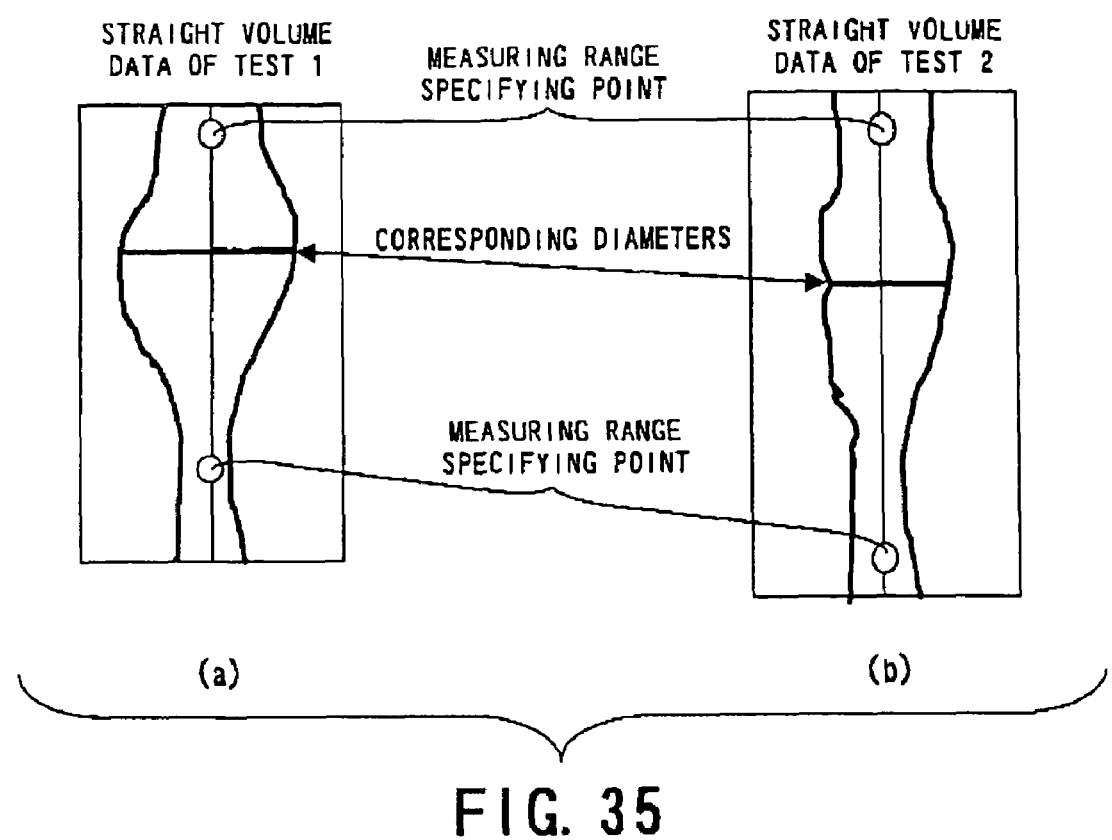
FIG. 35 illustrates positional alignment processing executed in the third embodiment.
Figure 36:
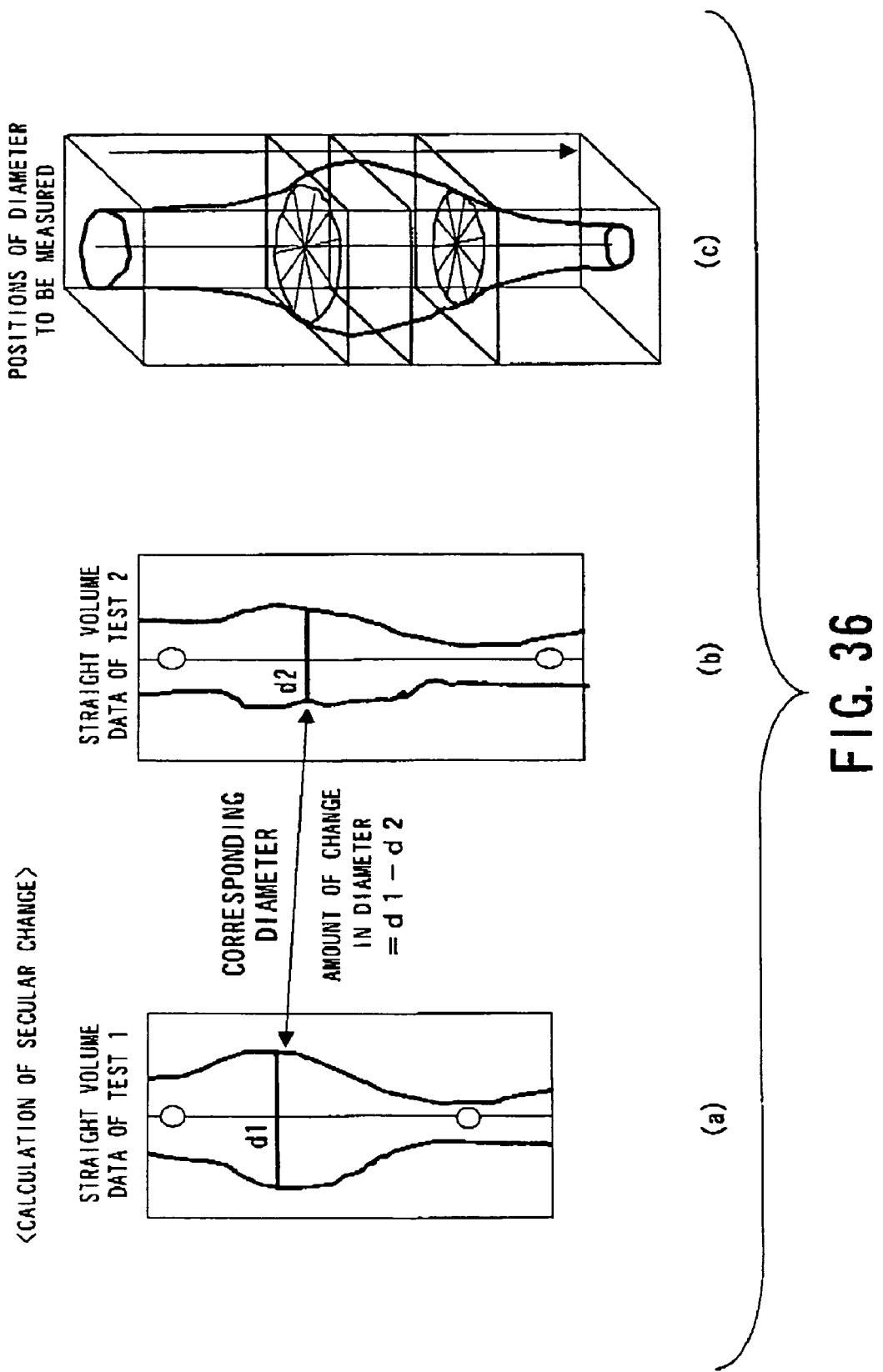
FIG. 36 illustrates the calculation of the secular change executed in the third embodiment.
Figure 37:
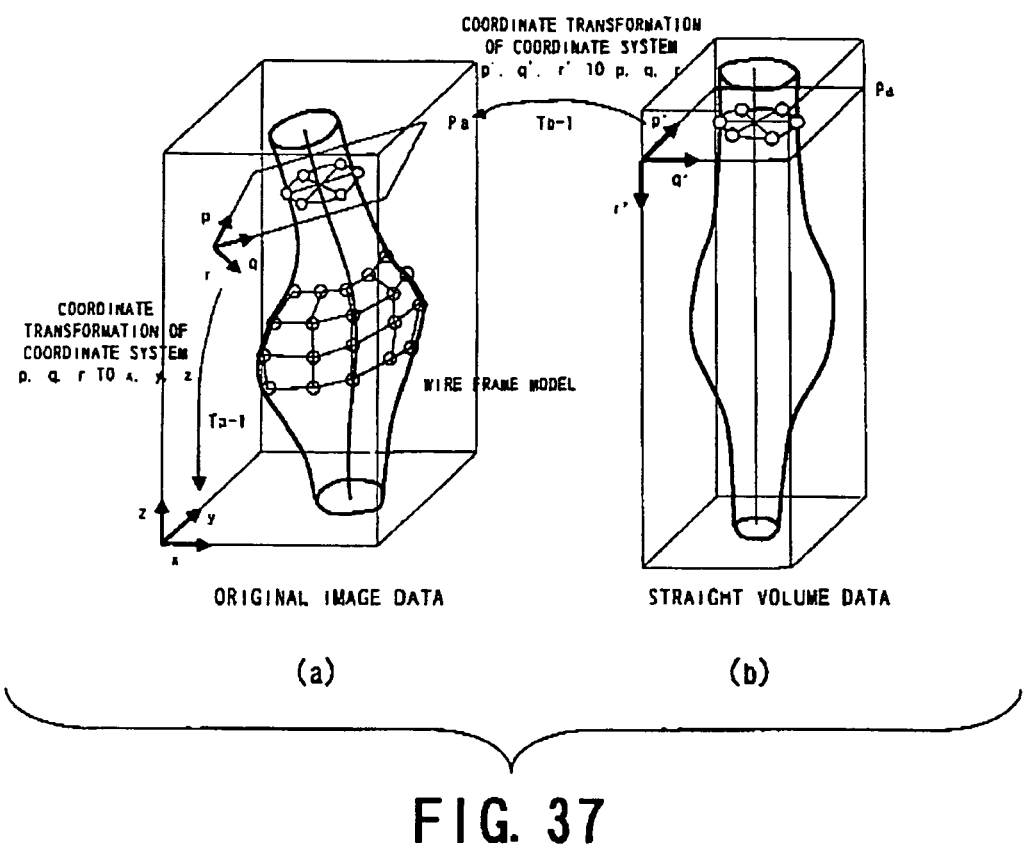
FIG. 37 illustrates preparation of a secular change image executed in the third embodiment.

The individual functional blocks will be described with reference to FIG. 34.

The display unit 13 provides a monitor display screen which displays the GUI section 13A and the image display section 13B. As a result, the display unit 13B can display image data (including secular change image data) stored in the video memory 11A provided in the image processor 11. The GUI section 13A has various buttons arranged for operating this processor for analysis, and is operated by means of a mouse 14A provided as a part of the input unit 14.

The image processor 11 takes charge of image processing, and has a hardware configuration comprising a CPU 111, a memory 11, a video memory 11A and the like. Through execution of prescribed processing programs of the CPU 111, the image processor 11 functionally has a mouse operation input section 11B, an image data storing section 11C, an image preparing section 11S, a vessel extraction processing section 11T, an image data aligning section 11U, a secular change calculating section 11V, and a secular change image preparing section 11W.

Among others, the mouse operation input section 11B takes charge of the measuring range setting processing and the GUI section button operation. By the measuring range setting processing, a measuring range is set on the basis of the position specified via the mouse 14A on images of the two comparative tests displayed on the image display section 13B of the monitor 13. The GUI section button operation processing processes data relating to button operation of the GUI section 13A on the basis of information instructed via the mouse 14.

The image preparing section 11S prepares images for carrying out position specification for setting a measuring range. The memory 11R calls image data of the two comparative tests stored in the image data storing section 11C into the memory 11R, and prepares an MPR image for each image data thereof. The data of the prepared MPR images are transferred to the video memory 11A.

The vessel extracting processing section 11T has a function to extract the blood vessel area and the thrombosis area adhering to the vessel inner wall within the specified measuring range of the image data of two comparative tests by processing the image data stored in the memory 11R. Such area extraction can be accomplished by the use of a technique for automatically extracting three-dimensionally the blood vessels and the thrombosis area from an X-ray CT angiographic image, developed by Marko Subasic et al. (reference "3-D Image analysis of abdominal aortic aneurysm" Medical Imaging 2001: Image Processing, Proceedings of SPIE vol. 4322 (2001), p. 388-394). This vessel extracting section 11T has also a function to extract the center lines of an extracted blood vessel area (or center lines in the area including thrombosis site). Extraction of center lines can be effected by the use of a technique to automatically extracting the vessel center lines three-dimensionally from an X-ray CT angiographic image developed by Onn Wink et al. (paper "Fast Delineation and Visualization of Vessel in 3-D angiography Images" IEEE Transaction on Medical Imaging, vol. 19, no, 4, April 2000).

The image data aligning section 11U takes charge of positional alignment of the straight volume preparation processing.

Among others, the straight volume preparation processing is carried out in the same manner as that described above (see FIG. 25). More specifically, directions of the image data of the two tests are aligned so that the direction of the human body is aligned with the test direction on the image data of the two comparative tests and the direction data of the human body in the image data, stored in the image data storing section 11C. Sectional images perpendicular to the vessel center line are piled up so that the vessel center lines within the measuring range form a straight line. As a result, the image data are re-constructed. The data are piled up so that, for example, the direction of human body from chest to back, as a reference direction, becomes upward relative to the sectional image, and data referred to as straight volume data are thus prepared.

The aligning processing is carried out for two straight volume data, as shown in FIGS. 35A and 35B, with the specified points of the measuring range as references. Corresponding sections are prepared through interpolation.

As shown in FIGS. 36A and 36B, the secular change calculating section 11V has a function to calculate the length of diameter between corresponding planes perpendicular to the vessel center line among straight volume data of two comparative tests (test time 1 and test time 2, the latter being a more past one), and determine the amount of change in diameter by the calculation of a formula "(diameter at test time 1)−(diameter at test time 2)" This calculation is performed at certain intervals in the vessel center line, at every certain angle on a section perpendicular to the vessel center line (see FIG. 36C).

The secular change calculating section 11V performs division of the amount of change in diameter by the time value of the two periods of the test time 1 and the test time 2, and a speed of change in diameter is thus determined.

The secular change calculating section 11V has a function to determine the amount of change in sectional area through steps of, for the individual straight volume data of the two comparative tests (test time 1 and test time 2; the test time 2 being more past), calculating the sectional area of the plane perpendicular to the corresponding vessel center line, and calculating a formula "(sectional area in test time 1)−(sectional area in test time 2)". This calculation is performed at certain intervals along the vessel center line as in the calculation for the vessel diameter.

In addition, the secular change calculating section 11V performs division of the amount of change in sectional area by the time value for the test time 1 and the test time 2, and thus determines the changing speed of sectional area.

As shown in FIGS. 37A and 37B, the secular change image preparing section 11W constructs a wire frame model having points converted from the terminal points of vessel diameter in the straight volume data into coordinates of the original image data as joints, and allocating the amount of change in diameter and the speed of change in diameter calculated by the secular change calculating section 11V.

More specifically, joints are added so that the distance between joints of the wire frame becomes less than a certain threshold value (for example, by adding a joint to the average coordinate position over four neighboring joints). Interpolating calculation of the amount of change in diameter and the speed of change in diameter is performed in response to the joint distance, and the resulting values of interpolation are allocated to the added joints.

The secular change image preparing section 11W conducts surface rendering on the basis of the prepared wire frame model. Upon surface rendering, surface colors are set in response to the amount of change in diameter and the speed of change in diameter allocated to the individual joint, and data of the image to be displayed are prepared. For example, image data is prepared so that the surface of a joint exceeding a threshold value is drawn in red. As the amount of change in diameter or the speed of change in diameter becomes larger, image data may be prepared to as to draw the surface in a color having a continuous gradation from blue to red. In this respect, it is desirable to prepare data for the color bar displaying the correspondence between color and value on the image, to permit easy identification visually of this correspondence.

The secular change image preparing section 11W carries out similar processing also for the change in sectional area. That is, also for the amount of change in sectional area, image data are prepared in the same manner as in the amount of change in diameter by allocating the same amount of change in sectional area or the same speed of change in sectional area to joints of the wire frame model on the same section perpendicular to the vessel center line.

The image data storing section 11C has a function to store and manage image data. These medical image data are usually managed so that images of sections perpendicular to the body axis direction are in the sequence of body axis positions, together with data showing the human body direction in the image data. The image data is read out in the memory 11R, and treated as three-dimensional image data. Image data are managed for each patient, and image data for the test of a particular patient are easily detectable.

The memory 11R has a function to read out the image data stored in the image data storing section 11C, and temporarily retain the data. Pixel data for the image data are managed so as to permit specification with three-dimensional coordinates. The video memory 1A retains the display image data prepared by the image preparing section 11S and the secular change image preparing section 11W so as to display images on the monitor 13. The operator can perform the operation for setting a measuring range on the image displayed on the image display section 13B, in addition to button operation of the GUI section 13A, by operation the mouse 14.

An example of the basic image display and analyzing processing executed on the processor for analyzing a tubular structure of this embodiment will be described with reference to FIGS. 38 to 40.

Figure 38:
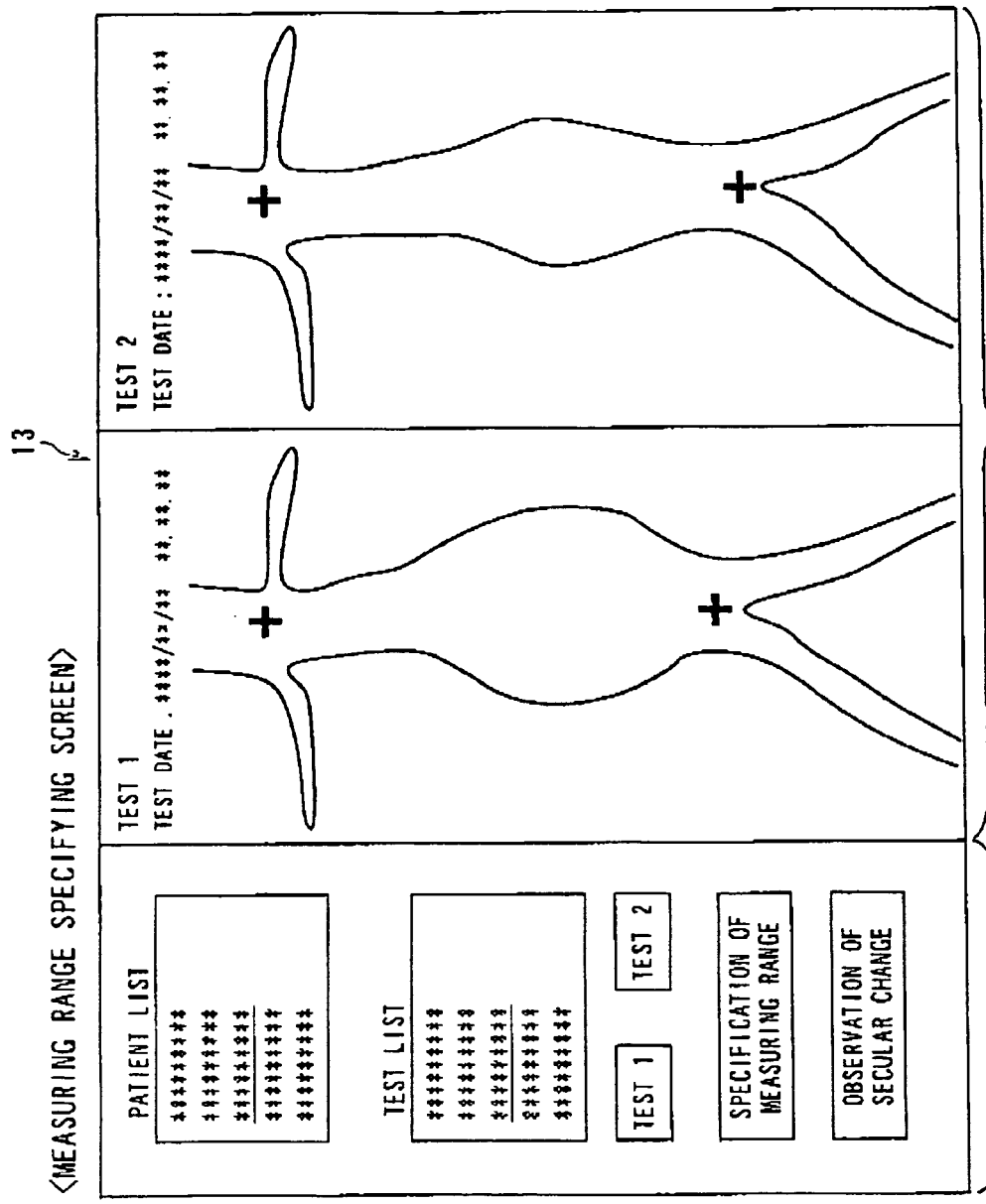
FIG. 38 illustrates a screen for showing a typical measuring range setting screen displayed in the third embodiment.
Figure 40:
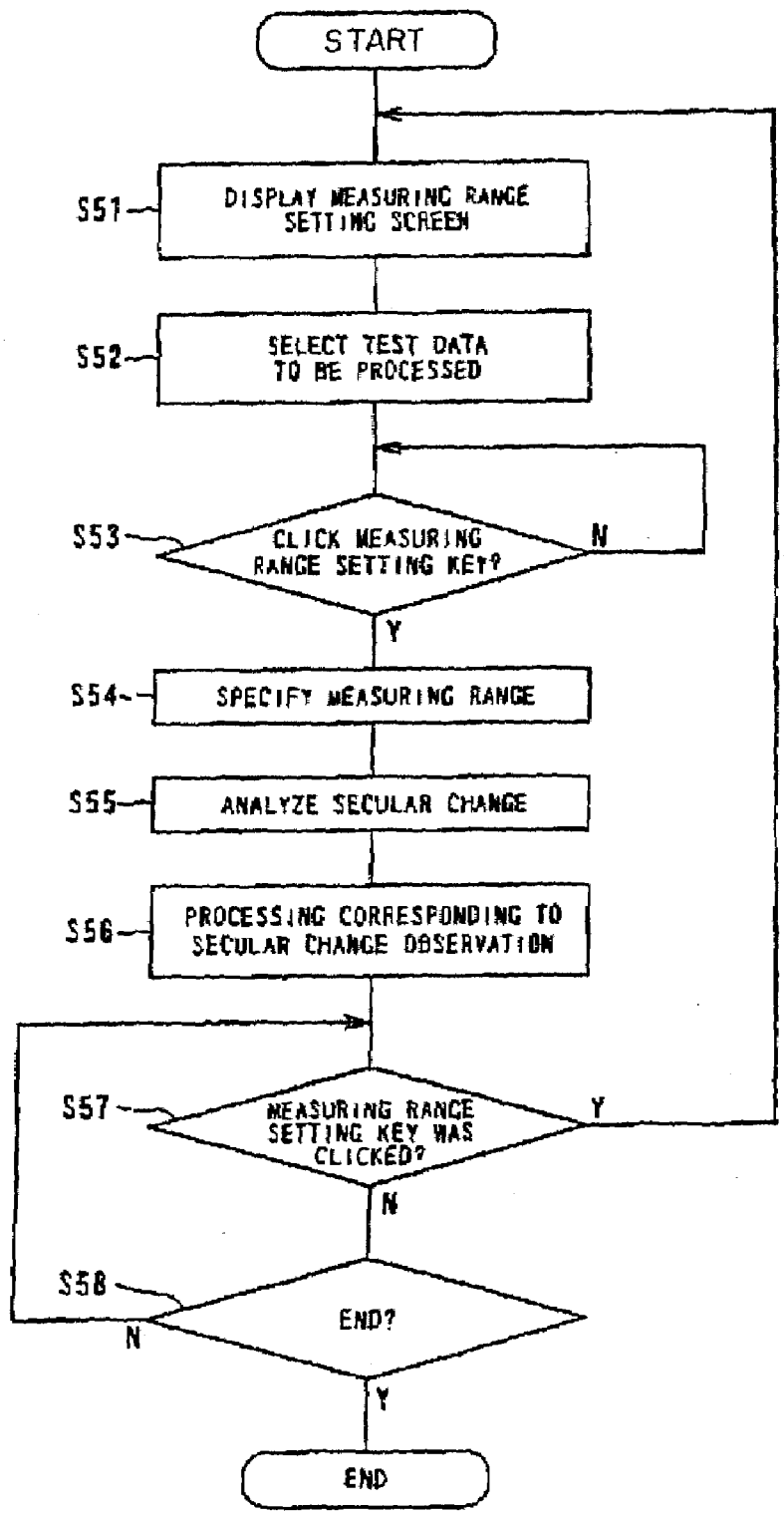
FIG. 40 is a rough flowchart explaining an outline of the processing for observing the secular change of a tubular structure, such as a blood vessel, executed in the third embodiment.

The image processor 11 the measuring range setting screen shown in FIG. 38 as an example on the image display section 13B of the monitor 13 (FIG. 40, step S51). Then, upon receipt of interactive operation information from the operator, and a patient and his (her) data are selected from the list of patients and the test list of the GUI section 13A (Step S52). For example, when the key "Test 1" (or "Test 2") is clicked, the image processor 11 prepares the specified image data by use of the function of the image preparing section 11S. The image display section 13B displays the image of the test 1 (or the test 2) on the display area thereof.

Then, the image processor 11 is in standby while determining whether or not the "measuring range specification" key of the GULI section is clicked (step S53).

When the "measuring range specification" key is clicked, the image processor 11 turns on the measuring specification mode by the use of the function of the mouse operation input section 11 thereof. As a result, the mouse operation input section 11B accept the measuring range position specified by the operator on the image of the test 1 or the test 2, sets a measuring range on the basis of this position, and conducts graphic display showing the measuring range on the image displayed on the image display section 13B (step S54).

Then, the image processor 11 waits for operator s clicking of the "secular change observation" key of the GUI section 13A, and transfers to the secular change analysis processing (step S55). This secular change analysis is executed in the following procedure.

(1): By the use of the function of the vessel extracting section, the image processor 11 automatically extracts blood vessels and thrombosis area, and vessel center lines within the specified measuring range.

(2): The image data aligning section 11U of the image processor is activated, and the above-mentioned straight volume preparing processing and positional aligning processing are executed. As a result, positional alignment is carried out with the vessel center lines of the data of the test 1 and the test 2 as reference.

(3): Then, the secular change calculating section 11V of the image processor calculates an amount of change in diameter and a speed of change in diameter.

(4): Then, the secular change image preparing section of the image processor 11 is activated, which prepares a secular change image, and transfers the data to the video memory 11A.

(5): As a result, an image showing the secular change is displayed on the image display section 13B as shown in FIG. 39 as an example. In parallel with this, the GUI section 13A is switched over to a screen shown in FIG. 39.

When these preparations are completed, the image processor 11 performs processing corresponding to the observation processing of the secular change image interactively with the operator (step S56).

Figure 39:
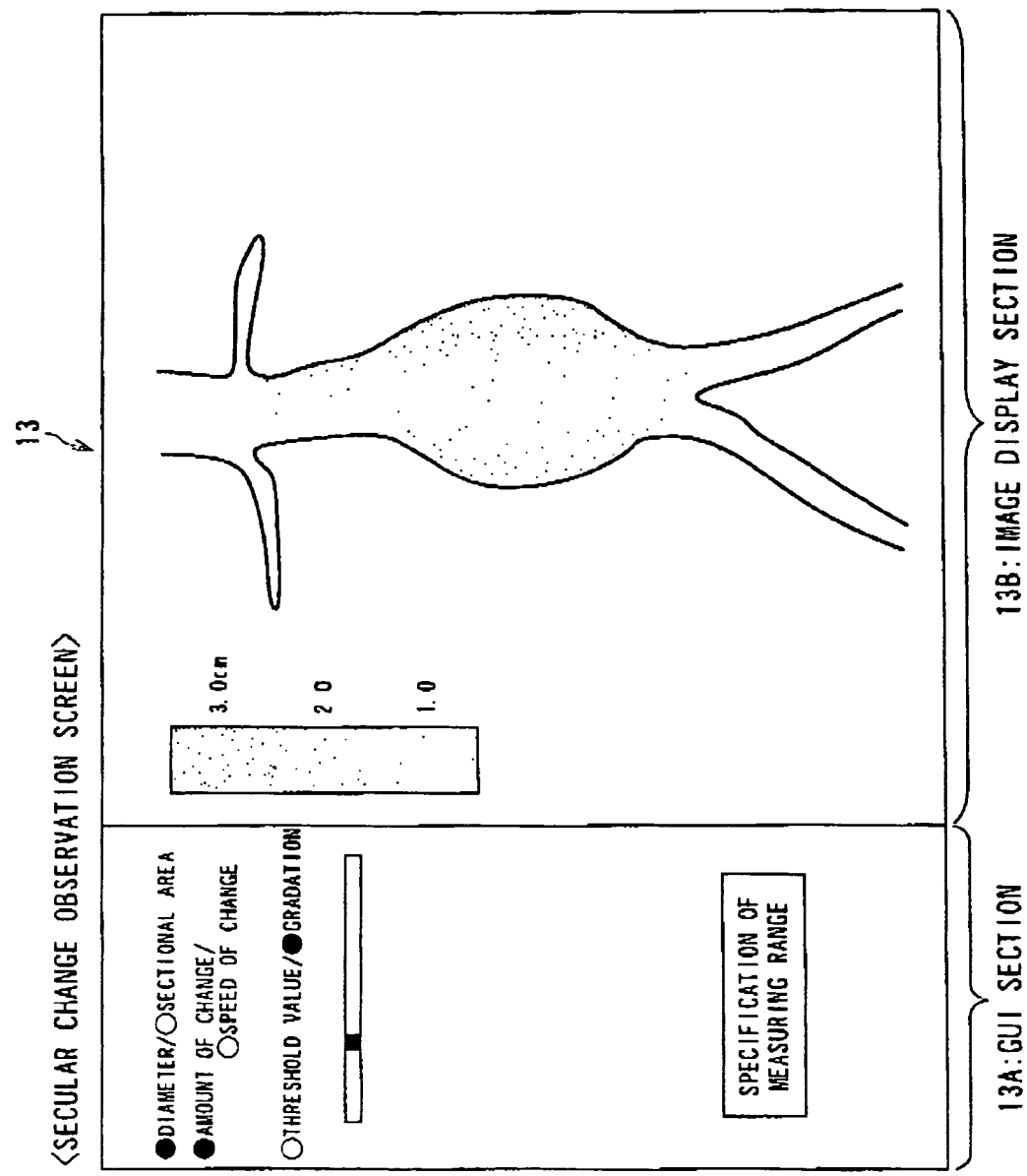
FIG. 39 illustrates a screen for showing a typical secular change observation screen displayed in the third embodiment.

That is, on this secular change observation screen, it is possible to select the amount of change in vessel's diameter or the speed of change, or the amount of change in sectional area or the speed of change (see the buttons of the GUI section 13A shown in FIG. 39). As a result, image data are prepared for each of the diameter and the sectional area, or for each of the amount of change and the speed of change, in response to the selection of a button of the operator under the effect of operation of the secular change image preparing section 11W of the image processor 11, and sent to the monitor 13 via the video memory 11A. As a result, the kind of secular change image of vessels displayed on the image display section 13, and are provided for observation.

On this secular change observation screen, the surface color of surface rendering can be selected on the basis of the "threshold value" or the "gradation" by operating clicking operation to the GUI section 13A. In response to this selection, the secular change image preparing section 11W prepares an image, and causes switching of the image displayed on the image display section 13B of the monitor 13. When the "gradation" button is selected, the secular change image preparing section 11W prepares a color bar at the same time, and causes the image display section 13B to display the color bar (see the image display section 13B in FIG. 39).

When moving the threshold value setting slider bar of the GUI section 13A, the secular change image preparing section 11W reacts to this, prepares image data so that the pixel portion showing a value exceeding the threshold value is red in color, and causes switching of the display on the image display section 13B.

Even during this observation, the image processor 11 is in standby while determining whether or not the "measuring range setting" key (see FIG. 39) shown in GUI section 13A is clicked, via the mouse operation input section 11B (step S57). When the "measuring range setting" key is clicked, the image processor 11 returns the process to step S51, and causes the display on the monitor 13 to be switched over to the measuring range setting screen shown in FIG. 38. As a result, the operator can conduct selection of data for observing the next secular change and measuring range setting.

As described above, selection of test data regarding the observation of secular change in vessels, specification of a measuring range, analysis of a secular change, and observation of a secular change can be repeatedly executed.

Therefore, it becomes easier to identify the three-dimensional vessel structure and observation of the secular change, thus permitting improvement of the diagnostic accuracy, and enables a physician to determine a proper timing of surgery.

According to the processor for analyzing a tubular structure of this embodiment, as described above, it is possible to more easily identify whole or part of the three-dimensional shape of a tubular structure such as blood vessels in a patient. This enable to easily determine and observe a position or state of a site to be observed such as a diseased site of stenosis or lumps. It is possible to largely alleviate the operational burden imposed on the operator who conducts diagnosis or observation, resulting in improvement of the operating efficiency.

In addition to the above, it is possible to more easily identify the orientation of a tubular structure. The tubular structure can be drawn with a natural contour. It is possible to more stably analyze the shape of the tubular structure at a higher accuracy. The labor required for manual editing of control points for setting the center line or the contour of a tubular structure can be largely reduced. The processor of the present invention can provide properly the information regarding secular change in three-dimensional structure of a local diseased site such as lumps of a tubular structure, thus facilitating comparative observation with past of the diseased site and prediction in future.

The present invention may be embodied in other specific forms without departing from the spirit or essential characteristics thereof. The present embodiments and variations are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An analyzer analyzing a tubular structure of an object to be examined, comprising:
   a preparing unit configured to prepare three-dimensional image data of the same object examined;
   an image data producing unit configured to produce, from the three-dimensional image data, data of at least one of a volume rendering image of the object, a maximum intensity projection (MIP) image of the three-dimensional image data, a flat reformatted image at an arbitrary section in the three-dimensional image data;
   a curved reformatted image producing unit configured to produce data of a curved reformatted image from the three-dimensional image data;
   a center line producing unit configured to produce three-dimensional position data of a center line of the tubular structure by using the three-dimensional image data;

a reference image displaying unit configured to display the center line by overlaying the position data of the center line on data of a reference image consisting of one of the volume rendering image, the maximum intensity protection (MIP) image, the flat reformatted image, and the curved reformatted image;

a curved reformatted image displaying unit configured to display the center line by overlaying the position data of the center line on the data of the curved reformatted image;

a center line correcting unit configured to be used for correcting a shape of the center line overlaid on the reference image displayed by the reference image displaying unit;

a curved reformatted image updating unit configured to reproduce, from the three-dimensional image data, the data of the curved reformatted image data displayed by the curved reformatted image displaying unit, in response to a correction of the shape of the center line on the reference image through the center line correcting unit, and to update the overlaying display of the center line on the reference image, updating the curved reformatted image responding substantially in real time to correcting the shape of the center line;

an analysis unit configured to analyze a morphological feature of the tubular structure;

a reception unit configured to receive a signal indicating whether or not the position of the center line displayed on both the reference image and the curved reformatted image is acceptable; and an analysis permitting unit configured to permit the analysis unit to analyze the morphological feature of the tubular structure only when the signal received by the reception unit indicates that the position of the center line is acceptable.

2. An analyzer analyzing a tubular structure of an object to be examined comprising:

a preparing unit configured to prepare three-dimensional image data of the same object examined;

an image data producing unit configured to produce, from the three-dimensional image data, data of at least one of a volume rendering image of the object, a maximum intensity projection (MIP) image of the three-dimensional image data, a flat reformatted image at an arbitrary section in the three-dimensional image data;

a curved reformatted image producing unit configured to produce data of a curved reformatted image from the three-dimensional image data;

a center line producing unit configured to produce three-dimensional position data of a center line of the tubular structure by using the three-dimensional image data;

a reference image displaying unit configured to display the center line by overlaying the position data of the center line on data of a reference image consisting of one of the volume rendering image, the maximum intensity projection (MIP) image, the flat reformatted image, and the curved reformatted image;

a curved reformatted image displaying unit configured to display the center line by overlaying the position data of the center line on the data of the curved reformatted image;

a center line correcting unit configured to be used for correcting a shape of the center line overlaid on the reference image displayed by the reference image displaying unit;

a curved reformatted image updating unit configured to reproduce from the three-dimensional image data, the data of the curved reformatted image data displayed by the curved reformatted image displaying unit, in response to a correction of the shape of the center line on the reference image through the center line correcting unit, and to update the overlaying display of the center line on the reference image, updating the curved reformatted image responding substantially in real time to correcting the shape of the center line;

a specifying unit configured to allow a plurality of markers to be specified on the tubular structure in the reference image, the plurality of markers indicating desired both end positions on the tubular structure and desired zero or more passage positions located between both the desired end positions;

a unit configured to divide the plurality of markers into a plurality of pairs of markers so that the plurality of pairs of markers are sequentially ordered according to a specifying order along which the plurality of markers are specified through the specifying unit;

a unit configured to display on the reference image segments mutually connecting the plurality of pairs of markers;

a unit configured to allow one or more additionally markers to be specified on the reference image, the additional markers indicating additional passage positions;

a unit configured to re-decide the order of the plurality of pairs of markers by deciding that the additional markers should be located between which two pairs of the plurality of pairs of markers when the additional markers are specified; and a unit configured to reproduce the data of the center line based on the plurality of pairs of markers re-decided.

3. The analyzer according to claim 2, comprising:

a unit used for moving the additionally specified markers on the reference image;

a unit configured to update the data of the curved reformatted image using the three-dimensional image data and to re-display the updated data of the curved reformatted image, in response to a move of the additionally specified markers, updating the curved reformatted image responding substantially in real time to the move of the additional markers.

4. An analyzer analyzing a tubular structure of an object to be examined, comprising:

a preparing unit configured to prepare three-dimensional image data of the same object examined;

an image data producing unit configured to produce, from the three-dimensional image data, as data of a reference image, data of at least one of a volume rendering image of the object, a maximum intensity projection (MIP) image of the three-dimensional image data, a flat reformatted image at an arbitrary section in the three-dimensional image data;

a unit configured to produce data of a center line indicating three-dimensional positional information of the tubular structure, from the three-dimensional image data;

a unit configured to produce data of either a stretched image or a perpendicular sectional image of the tubular structure on the basis of the data of the center line;

a unit configured to use the data of the reference image, the either stretched image or the perpendicular sectional image, and the center line so that the reverence image with the center line overlaid thereon and either the stretched image or the perpendicular sectional image with the center line overlaid thereon are displayed side by side;

a unit configured to be used for specifying a position-changeable marker indicative of both view information and interested-point information toward the tubular structure on the center line in each of the reference image and the stretched image;

a unit configured to respond to a position change of the marker on the stretched image so that the reference image into which the positioned change is reflected is re-depicted;

a unit for displaying, on the perpendicular sectional image, a view information marker being changeable in a direction thereof and indicating the view information; and a unit configured to re-depict the reference image to respond to a directional change of the view information marker when the direction of the view information marker is changed.

5. The analyzer according to claim 4, comprising a unit configured to display an indicator on the reference image, the indicator indicating a direction of a section of the stretched image.

6. The analyzer according to claim 5, wherein the indicator includes two markers individually placed at arbitrary positions on both wall portions of the tubular structure in the stretched image and two markers individually placed at both wall portions of the tubular structure in the reference image, the two markers on the stretched image positionally corresponding, for each wall of the tubular structure, to the two markers on the reference image.

7. The analyzer according to claim 6, wherein the indicator includes a further marker not only being superimposed on the reference image through the two markers on the reference image but also indicating a contour shape of the tubular structure.

8. The analyzer according to claim 5, wherein the indicator includes a cursor bar placed at an arbitrary poison on the stretched image and two markers individually placed on both wall portions of the tubular structure in the reference image, both side wall portions at which the two markers are individually placed being positionally corresponding to the cursor bar.

* * * * *